US010481634B2

(12) United States Patent
Mizoguchi et al.

(10) Patent No.: US 10,481,634 B2
(45) Date of Patent: Nov. 19, 2019

(54) PORTABLE INFORMATION DEVICE

(71) Applicant: LENOVO (SINGAPORE) PTE. LTD., Singapore (SG)

(72) Inventors: Fumitake Mizoguchi, Yokohama (JP); Takehito Yamauchi, Yokohama (JP); Kazuya Tatsuno, Yokohama (JP); Kenji Watamura, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/288,916

(22) Filed: Feb. 28, 2019

(65) Prior Publication Data

US 2019/0196543 A1    Jun. 27, 2019

Related U.S. Application Data

(63) Continuation-in-part of application No. 16/048,228, filed on Jul. 28, 2018, now Pat. No. 10,386,886, which is a continuation of application No. 15/855,695, filed on Dec. 27, 2017, now Pat. No. 10,082,827.

(30) Foreign Application Priority Data

Jan. 10, 2017    (JP) ................................ 2017-002063

(51) Int. Cl.
     *G06F 1/16*        (2006.01)

(52) U.S. Cl.
     CPC .......... *G06F 1/1616* (2013.01); *G06F 1/1626* (2013.01); *G06F 1/1637* (2013.01); *G06F 1/1641* (2013.01); *G06F 1/1652* (2013.01); *G06F 1/1681* (2013.01)

(58) Field of Classification Search
     CPC ............................. G06F 1/1681; G06F 1/1682
     USPC ............................ 361/679.3, 679.26, 679.27
     See application file for complete search history.

(56) References Cited

U.S. PATENT DOCUMENTS

| 8,787,016 B2 | 7/2014 | Rothkopf et al. |
| 8,971,031 B2 | 3/2015 | Mok et al. |
| 9,250,733 B2 | 2/2016 | Lee et al. |

(Continued)

FOREIGN PATENT DOCUMENTS

| JP | 2009-088668 A | 4/2009 |
| JP | 2011-119831 A | 6/2011 |

(Continued)

*Primary Examiner* — Anthony Q Edwards
(74) *Attorney, Agent, or Firm* — Shimokaji IP

(57) ABSTRACT

A portable information device is capable of securing the appearance quality and the durability of products while having a foldable configuration. The portable information device has a backbone member provided throughout and between the inner surface of one edge portion of a first chassis member and the inner surface of one edge portion of a second chassis member so as to cover a gap between the one edge portion of the first chassis member and the one edge portion of the second chassis member connected by a hinge mechanism. The backbone member is provided to the inner surface of the one edge portion of the first chassis member so as to be slidable in an X direction from the second chassis member to the first chassis member along the inner surface, and is non-slidably fixed to the inner surface of the one edge portion of the second chassis member.

4 Claims, 17 Drawing Sheets

(56) References Cited

U.S. PATENT DOCUMENTS

| | | | |
|---|---|---|---|
| 9,600,035 B2 | 3/2017 | Park et al. | |
| 10,082,839 B1* | 9/2018 | Turchin | G06F 1/1641 |
| 10,198,041 B2* | 2/2019 | Myeong | G02F 1/133305 |
| 2004/0264118 A1* | 12/2004 | Karidis | G06F 1/1616 |
| | | | 361/679.55 |
| 2008/0176610 A1 | 7/2008 | Pan et al. | |
| 2011/0063783 A1* | 3/2011 | Shim | G06F 1/1615 |
| | | | 361/679.01 |
| 2014/0355195 A1 | 12/2014 | Kee et al. | |
| 2015/0153780 A1 | 6/2015 | Maatta et al. | |
| 2016/0187935 A1* | 6/2016 | Tazbaz | G06F 1/1681 |
| | | | 361/679.03 |
| 2016/0195901 A1* | 7/2016 | Kauhaniemi | G06F 1/1652 |
| | | | 361/679.27 |

FOREIGN PATENT DOCUMENTS

| | | | |
|---|---|---|---|
| JP | 2014216025 A | 11/2014 | |
| JP | 2016-122235 A | 7/2016 | |

* cited by examiner

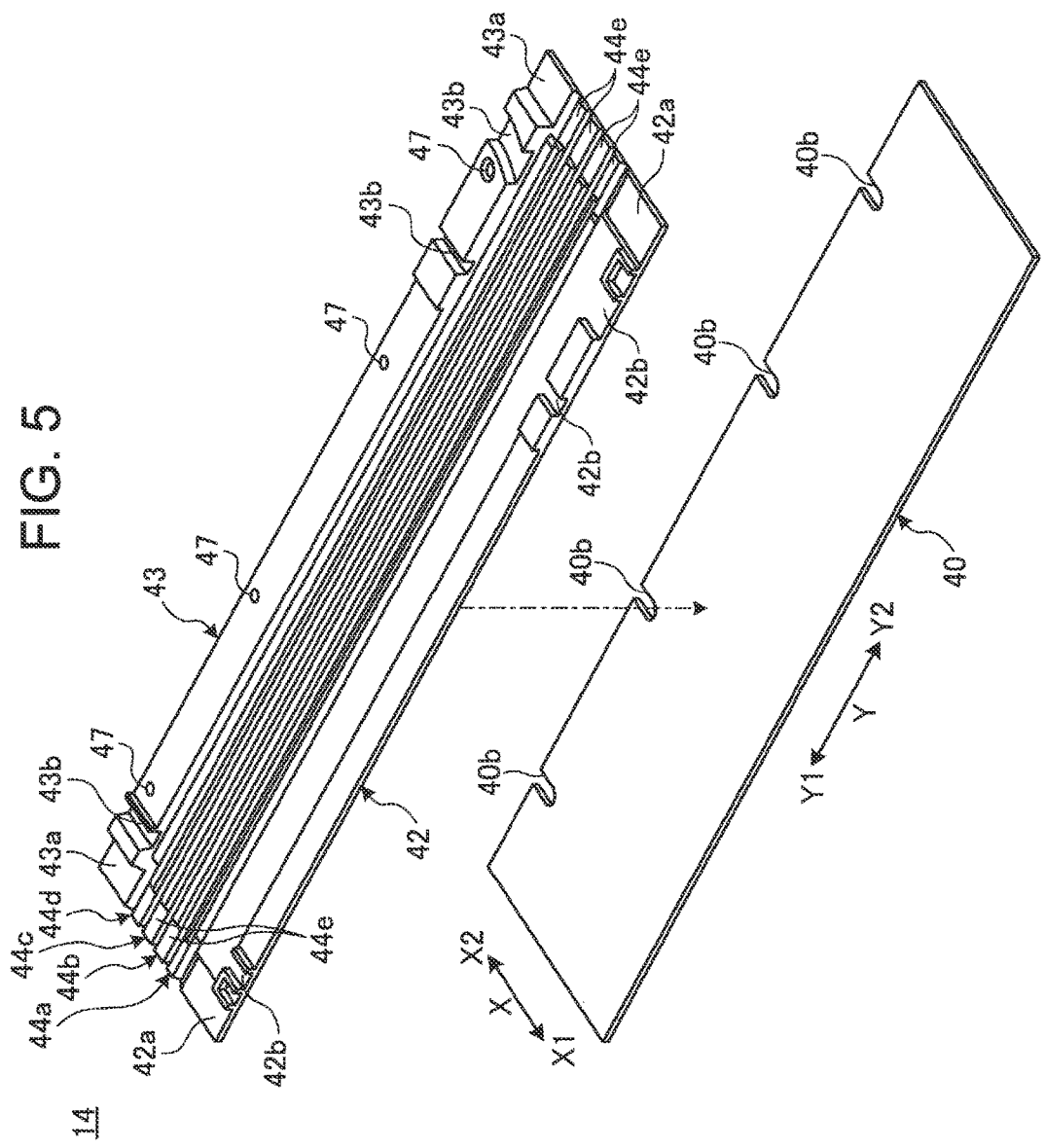

PORTABLE INFORMATION DEVICE

CROSS-REFERENCE TO RELATED APPLICATIONS

This application is a continuation-in-part of U.S. application Ser. No. 16/048,228 filed Jul. 28, 2018 which is a continuation of U.S. application Ser. No. 15/855,695, filed Dec. 27, 2017 which claims the benefit of JP application 2017002063 filed Jan. 10, 2017, all of which are incorporated herein by reference.

FIELD OF THE INVENTION

The present invention relates to a portable information device provided with a foldable display on the inner sides of a pair of foldable chassis members.

BACKGROUND OF THE INVENTION

In recent years, portable information devices, such as a tablet PC and a smartphone having a touch panel type liquid crystal display and not having a physical keyboard, have rapidly spread. The display of this kind of portable information device has been desired to be large in use but has been desired to be miniaturized in carrying. Then, a portable information device has been proposed in which not only a chassis but a display is configured so as to be foldable by the use of a flexible display, such as organic EL (Electro Luminescence) (for example, see Patent Document 1).

[Patent Document 1] Japanese Patent Application Laid-Open No. 2014-216025

SUMMARY OF THE INVENTION

As a chassis of the above-described folding structure, a configuration of connecting adjacent edge portions between a pair of chassis members arranged side by side on the right side and the left side by a hinge mechanism is mentioned, for example. However, with this configuration, when the pair of chassis members is closed into a double-folded state, a gap is generated between edge portions on the hinge sides of the chassis members. Then, internal elements are exposed from the gap, which has posed problems in the appearance quality, durability, and the like of products.

The present invention has been made considering the problems of the former technique described above. It is an object of the present invention to provide a portable information device capable of securing the appearance quality or the durability of products while having a foldable configuration.

A portable information device according to the present invention has a first chassis member and a second chassis member foldably connected by the connection of one edge portions disposed adjacent to each other by a hinge mechanism, a display which is provided over inner surfaces of the first chassis member and the second chassis member and which is foldable into a double-folded state, and a backbone member provided throughout and between the inner surface of the one edge portion of the first chassis member and the inner surface of the one edge portion of the second chassis member so as to cover a gap between the one edge portion of the first chassis member and the one edge portion of the second chassis member connected by the hinge mechanism, in which the backbone member is provided to the inner surface of the one edge portion of the first chassis member so as to be slidable in a direction from the second chassis member to the first chassis member along the inner surface and is non-slidably fixed to the inner surface of the one edge portion of the second chassis member.

A configuration may be acceptable in which the backbone member has a flexible sheet-like member, and a reinforcing member which is stuck to the inner surface of the flexible sheet-like member, and extends along the one edge portions of the first chassis member and the second chassis member.

A configuration may be acceptable in which two or more of the reinforcing members are arranged in parallel along a direction from the one edge portion of the first chassis member to the one edge portion of the second chassis member and the reinforcing members form an arch shape in which the side surfaces of the reinforcing members abut on each other on the inner surface side of a bending portion of the flexible sheet-like member in a state where the first chassis member and the second chassis member are folded into a double-folded state through the hinge mechanism.

A configuration may be acceptable in which an elastic member energizing the backbone member along the slide direction from the second chassis member to the first chassis member is provided.

A configuration may be acceptable in which a groove portion for passing a wiring line connecting the first chassis member side and the second chassis member side is provided in the inner surface of the backbone member along a direction from the first chassis member to the second chassis member.

A configuration may be acceptable in which a lid member closes an opening of the groove portion.

A configuration may be acceptable in which a support plate which is fixed to the inner surface sides of the first chassis member and the second chassis member is provided and supports the rear surface of the display, and a metal sheet-like member is used as the lid member.

A configuration may be acceptable in which one end portion of the lid member is fixed to the surface of the backbone member and the other end portion opposite to the one end portion thereof is movably placed on the surface of the backbone member in the slide direction of the backbone member.

A configuration may be acceptable in which the other end portion of the lid member extends beyond an end portion of the backbone member.

The present invention can secure the appearance quality or the durability of a product of a portable information device although the portable information device has a foldable configuration.

BRIEF DESCRIPTION OF THE DRAWINGS

FIG. 5 is an exploded perspective view of the backbone member.

DETAILED DESCRIPTION OF THE INVENTION

Hereinafter, a preferable embodiment of a portable information device according to the present invention is described in detail with reference to the attached drawings.

1. Description of Entire Configuration of Portable Information Device

Figure 1:
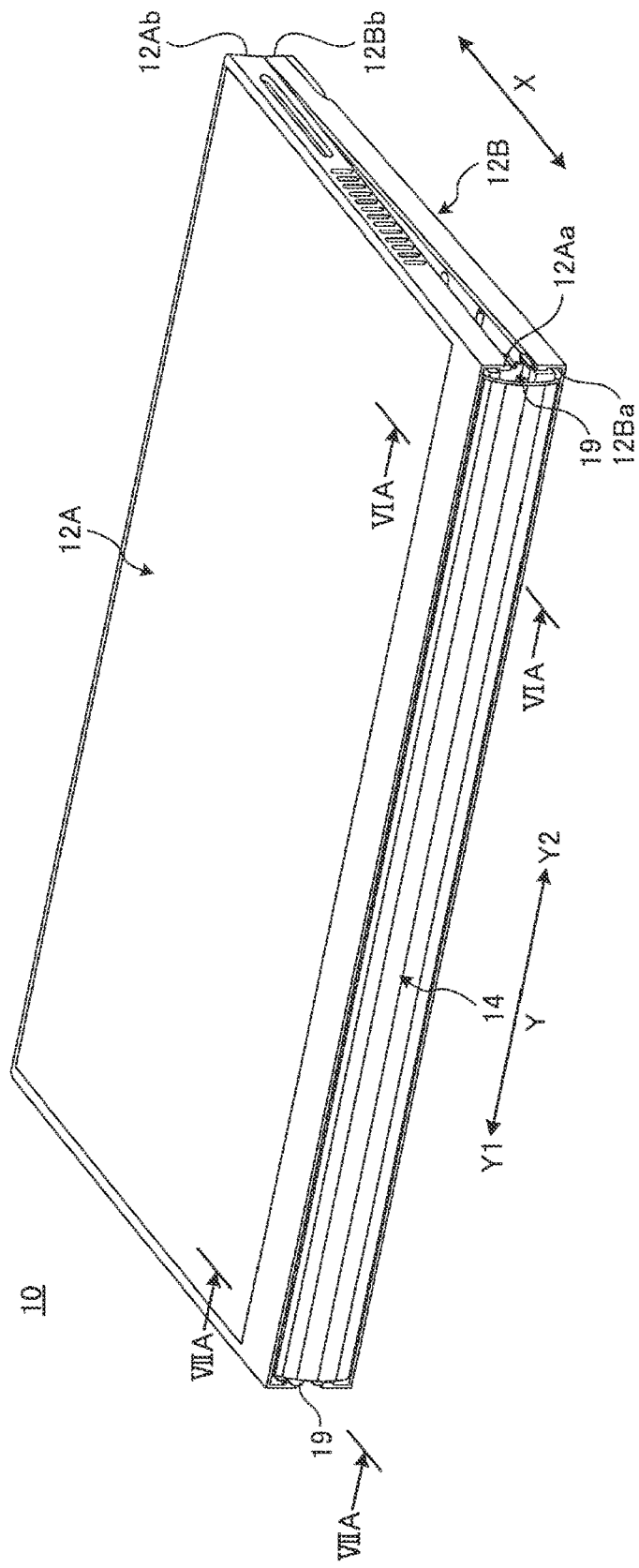
FIG. 1 is a perspective view illustrating a state where a portable information device according to one embodiment of the present invention is closed into a storage form.
Figure 2:
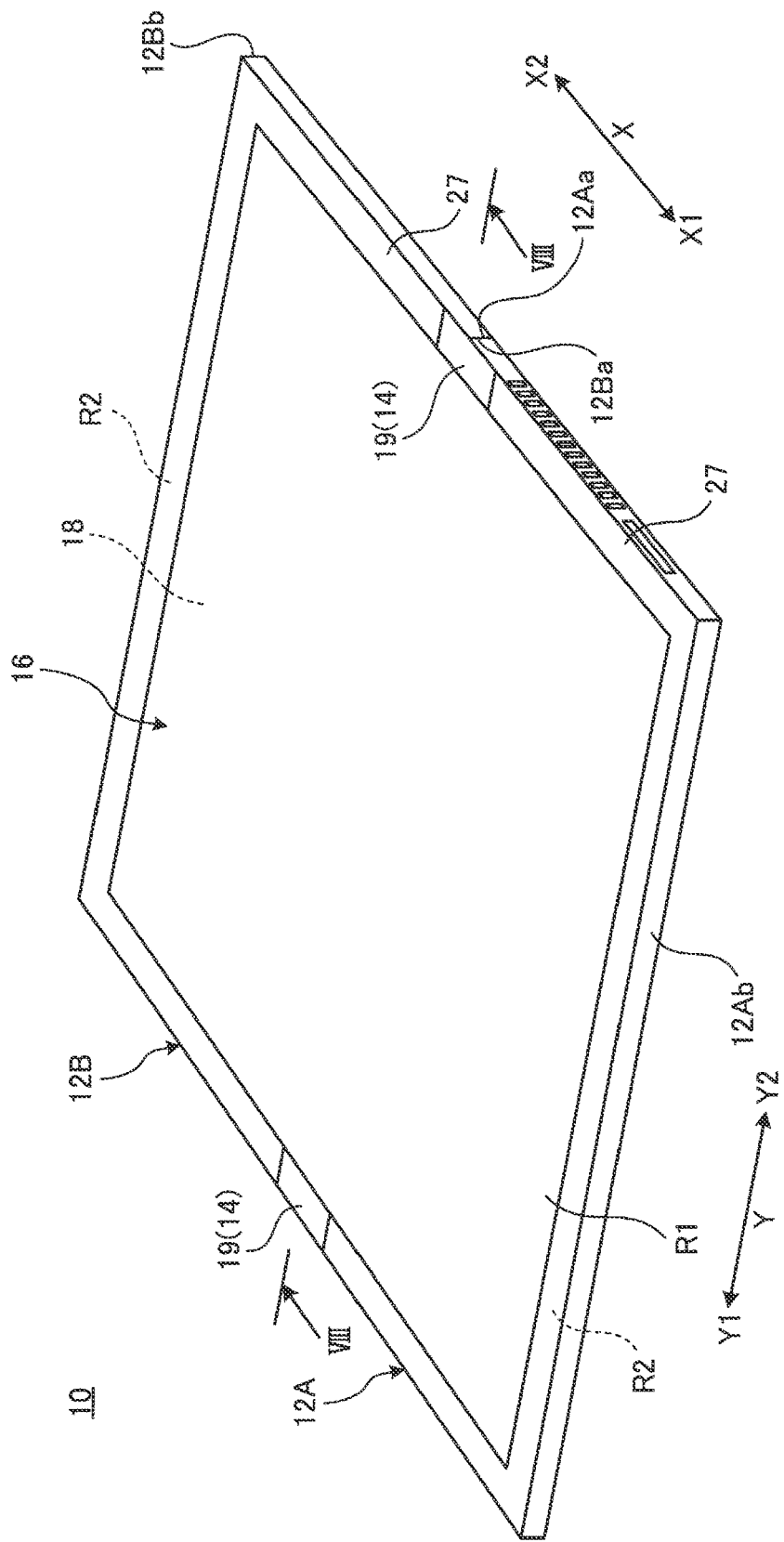
FIG. 2 is a perspective view schematically illustrating a state where the portable information device illustrated in FIG. 1 is opened into a usage form.
Figure 3:
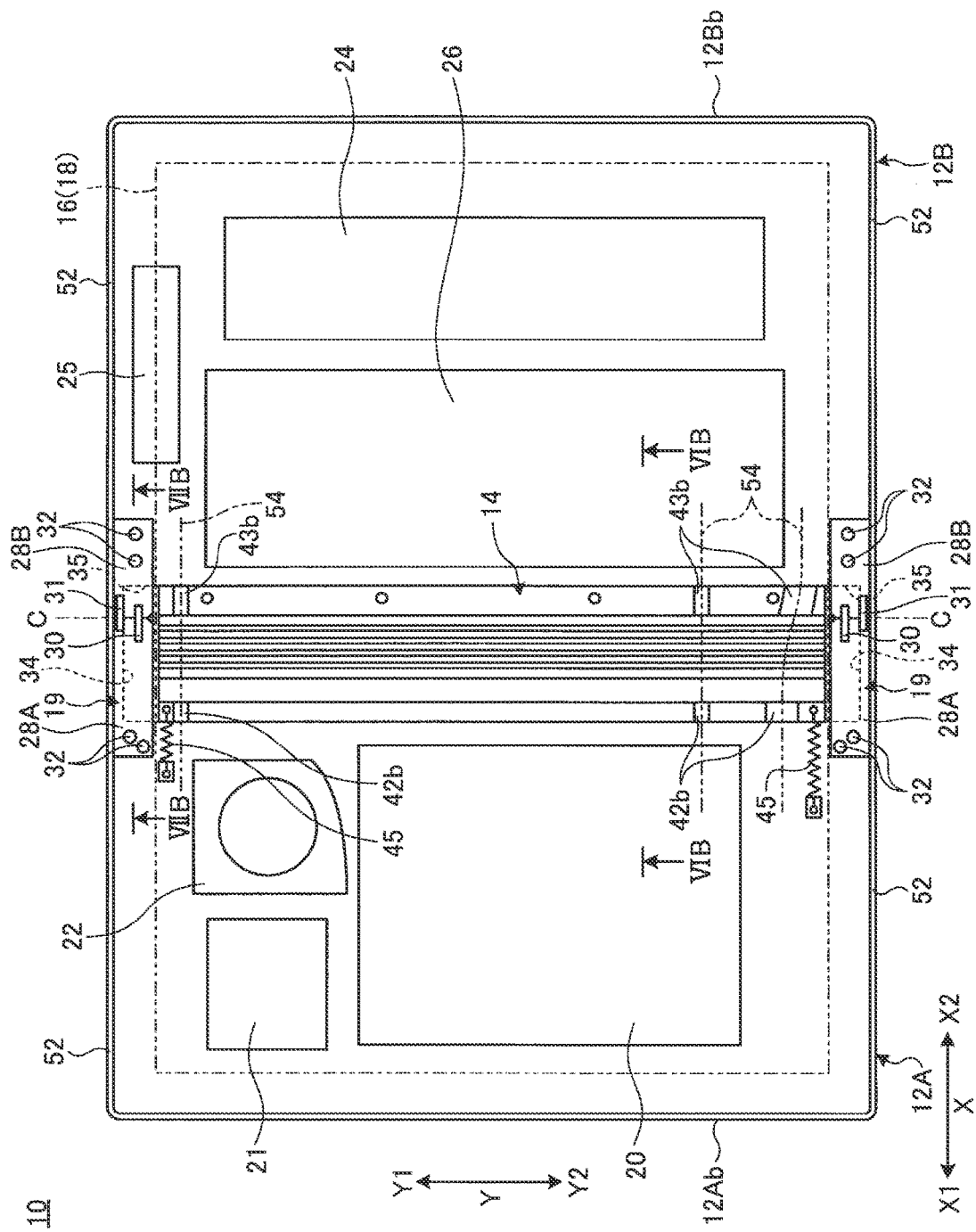
FIG. 3 is a plan view schematically illustrating the internal structure of the portable information device illustrated in FIG. 2.

FIG. 1 is a perspective view illustrating a state where a portable information device 10 according to one embodiment of the present invention is closed into a storage form. FIG. 2 is a perspective view schematically illustrating a state where the portable information device 10 illustrated in FIG. 1 is opened into a usage form. FIG. 3 is a plan view schematically illustrating the internal structure of the portable information device 10 illustrated in FIG. 2.

As illustrated in FIG. 1 and FIG. 2, the portable information device 10 has a first chassis member 12A, a second chassis member 12B, a backbone member 14, and a display 16. This embodiment describes a tablet type PC which is foldable into a double-folded state like a book as an example of the portable information device 10. The portable information device 10 may be a cellular phone, a smartphone, an electronic notebook, or the like.

The chassis members 12A and 12B each are rectangular plate-like members in which the side wall is formed so as to be raised on three sides other than the side corresponding to the backbone member 14. The chassis members 12A and 12B each contain metal plates of stainless steel, magnesium, aluminum, and the like; and/or fiber reinforced resin plates containing reinforced fibers, such as carbon fibers, and the like, for example. To the inner surface sides of the chassis members 12A and 12B, a display 16 is fixed through a support plate 18 (see also FIG. 6B). The chassis members 12A and 12B are connected through a pair of hinge mechanisms 19 and 19 provided in both end portions of the backbone member 14. The hinge mechanisms 19 connect the chassis members 12A and 12B so as to be foldable into the storage form illustrated in FIG. 1 and the usage form illustrated in FIG. 2. A line C illustrated by the dashed line in FIG. 3 represents a bending center C serving as the center of a folding operation of the chassis members 12A and 12B.

In the chassis members 12A and 12B, inner end surfaces 12Aa and 12Ba on the backbone member 14 side serve as hinge sides, and outer end surfaces 12Ab and 12Bb on the side opposite to the backbone member 14 serve as open end portion sides.

As illustrated in FIG. 3, a main substrate 20, a communication module 21, a cooling fan 22, and the like are attached and fixed to the inner surface of the first chassis member 12A using a screw or the like which is not illustrated. To the inner surface of the second chassis member 12B, a sub-substrate 24, an antenna 25, a battery device 26, and the like are attached and fixed using a screw or the like which is not illustrated. The main substrate 20 is an electronic substrate for performing the overall control of the portable information device 10 and carries various kinds of electronic components, such as a central processing unit (CPU) and a memory which are not illustrated. The communication module 21 is a device performing information processing of various wireless communications of wireless LAN (Local Area Network) and the like performing transmission and receiving with the antenna 25. The cooling fan 22 is a fan for cooling heat generated in the central processing unit and the like mounted on the main substrate 20. The sub-substrate 24 is an electronic substrate functioning as a controller controlling the display state of the display 16. The battery device 26 is a power supply of the portable information device 10 and can be charged from an external power supply through a power cable which is not illustrated.

The display 16 is a touch panel type liquid crystal display, for example. The display 16 is structured so as to be foldable together with the chassis members 12A and 12B when the chassis members 12A and 12B are folded. The display 16 is a flexible display, such as an organic EL having a paper structure with high flexibility, for example and is opened/closed with an opening/closing operation of the chassis members 12A and 12B.

The display 16 is attached and fixed to the inner surface sides of the chassis members 12A and 12B through the support plate 18 using a screw which is not illustrated. The rear surface of the display surface (front surface) of the display 16 is pasted and fixed to the surface of the support plate 18 using an adhesive, a double-sided tape, or the like. In the case of this embodiment, the support plate 18 has a pair of plate members 18a and 18a which are disposed on the inner surface sides of the chassis members 12A and 12B and are connected to each other so as to be bendable centering on the bending center C (see FIG. 6A and FIG. 6B). To the entire surface of the pair of plate members 18a and 18a, a sheet-like member 18b is stuck, whereby the pair of plate members 18a and 18a is connected to each other so as to be bendable.

The plate members 18a contain metal plates of stainless steel, magnesium, aluminum, and the like; and/or fiber reinforced resin plates in which a matrix resin containing a thermosetting resin or a thermoplastic resin is impregnated with reinforced fibers, such as carbon fibers, and the like, for example. In this embodiment, a carbon fiber reinforced resin plate containing carbon fibers as a reinforced resin is used. The sheet-like member 18b is a thin film containing a material having flexibility, such as a thin resin film or metallic foil. The sheet-like member 18b is stuck to the entire surfaces of the plate members 18a and 18a. In this embodiment, metallic foil containing stainless steel is used as the sheet-like member 18b. The display 16 is pasted to the surface of the sheet-like member 18b using an adhesive or the like. In the sheet-like member 18b, a portion covering adjacent end portions of the plate members 18a functions as a bending portion (flexible hinge) of the support plate 18.

Figure 6A:
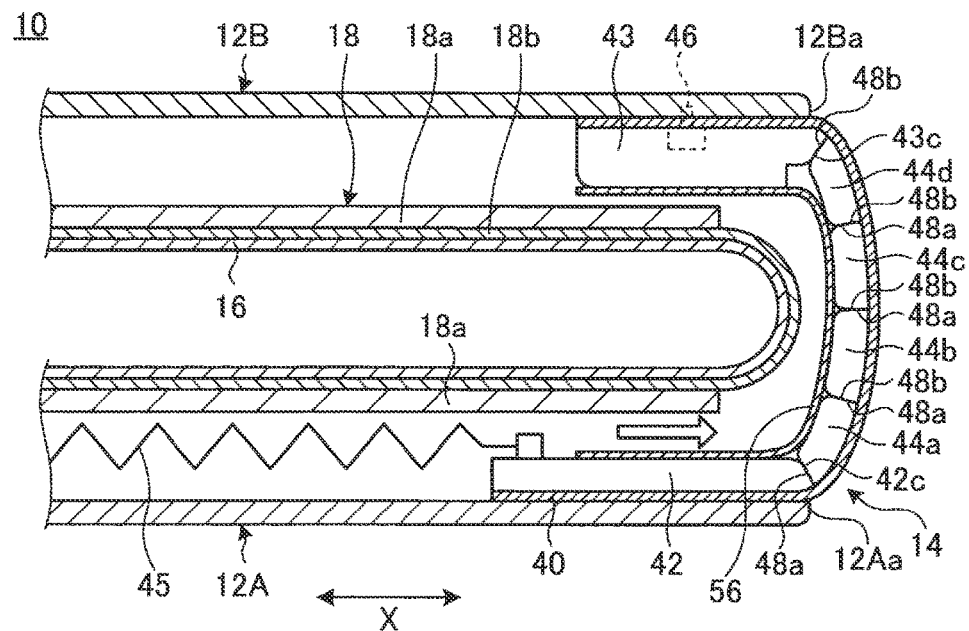
FIG. 6A is a cross-sectional view schematically illustrating the cross-sectional structure along the VIA-VIA line in FIG. 1.
Figure 6B:
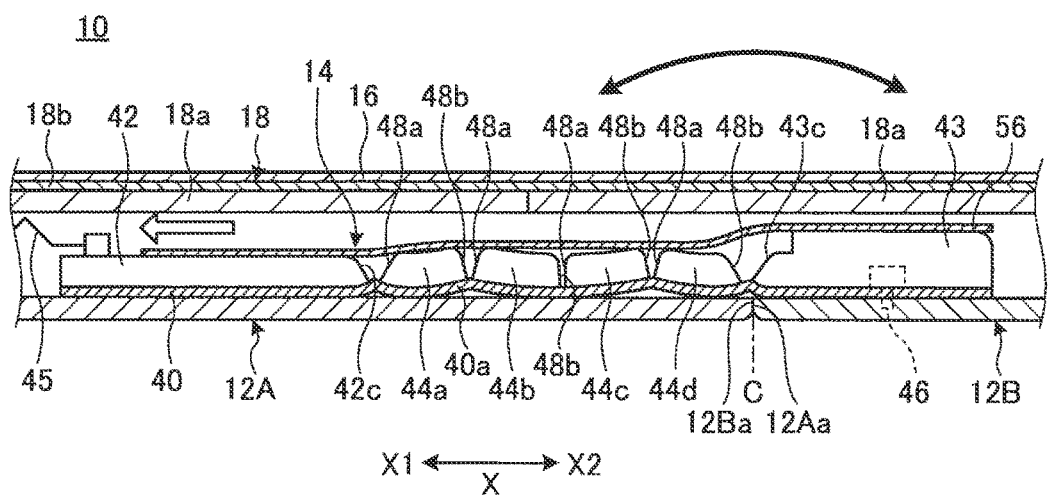
FIG. 6B is a cross-sectional view schematically illustrating the cross-sectional structure along the VIB-VIB line in FIG. 3.

In the support plates 18, the adjacent end surfaces of the pair of plate members 18a and 18a abut on each other in the usage form in which the chassis members 12A and 12B are opened into a flat shape (see FIG. 6B). In the support plate 18, the adjacent end surfaces of the pair of plate members 18a and 18a are separated from each other in the storage form in which the chassis members 12A and 12B are folded into a double-folded state (see FIG. 6A).

Figure 8:
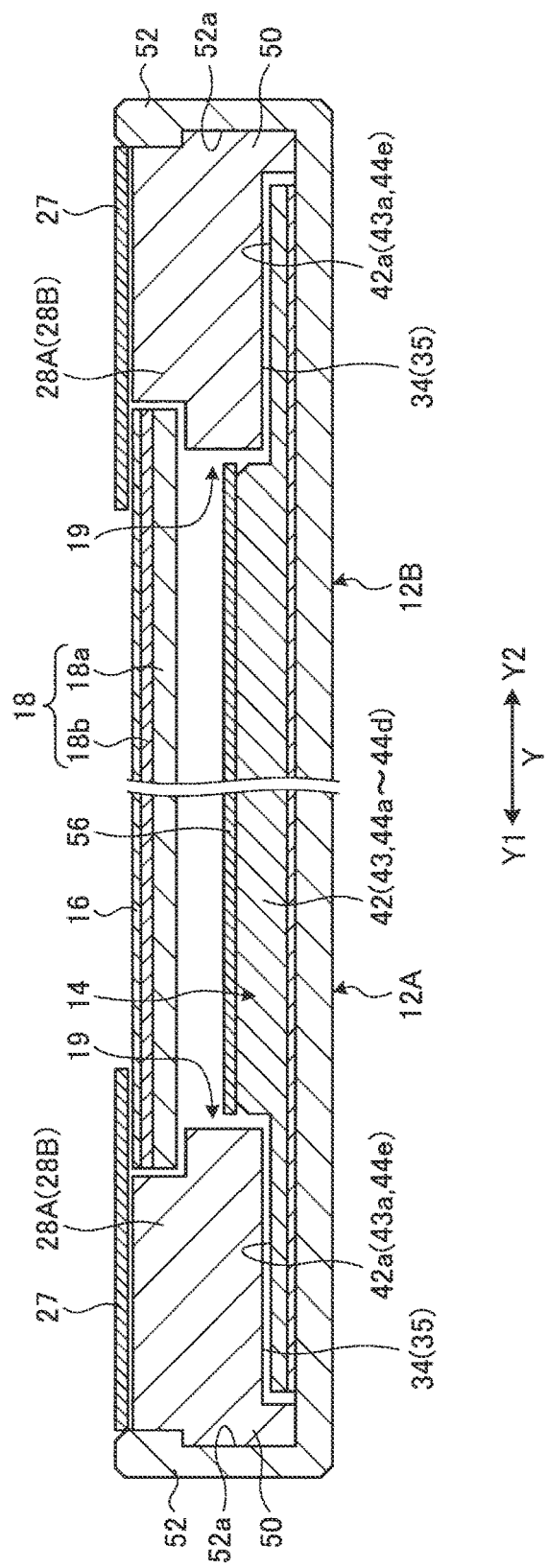
FIG. 8 is a cross-sectional view schematically illustrating the cross-sectional structure along the VIII-VIII line in FIG. 2.

As illustrated in FIG. 2, a bezel member 27 is disposed on an outer peripheral edge portion of the surface of the display 16 in the state of being attached and fixed to the inner surface sides of the chassis members 12A and 12B (see also FIG. 8). The bezel member 27 is provided so as to cover a non-displaying region (inactive region) R2 of the outer peripheral edge portion excluding a display region (active region) R1 of the surface of the display 16.

Thus, the portable information device 10 can be configured so as to be changed into the usage form illustrated in FIG. 1 and the storage form illustrated in FIG. 2 by opening/closing the display 16 provided on the inner side by opening/closing the pair of chassis members 12A and 12B.

Hereinafter, as illustrated in FIG. 1 to FIG. 3, the portable information device 10 is described designating a direction from the backbone member 14 to the outer end surfaces 12Ab and 12Bb as an X direction, and a direction along the longitudinal direction of the backbone member 14 as a Y direction. With respect to the X direction, a direction from the backbone member 14 to the one outer end surface 12Ab is sometimes referred to as an X1 direction, and a direction from the backbone member 14 to the other outer end surface 12Bb is sometimes referred to as an X2 direction. Similarly, with respect to the Y direction, a direction to one side (upper side in FIG. 3) in the longitudinal direction of the backbone member 14 is sometimes referred to as a Y1 direction, and a direction to the other side (lower side in FIG. 3) is sometimes referred to as a Y2 direction.

2. Description of Hinge Mechanism

Figure 4:
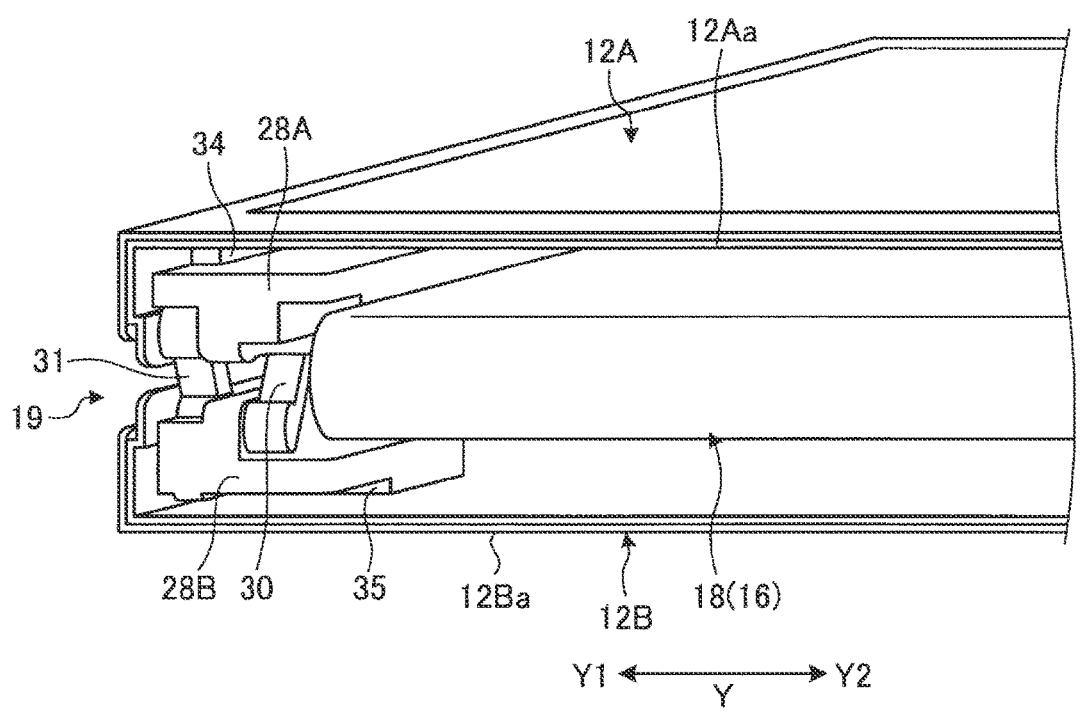
FIG. 4 is an enlarged perspective view of a principal portion in a state where a backbone member is omitted from the portable information device illustrated in FIG. 1.

An example of the configuration of the hinge mechanism 19 connecting the chassis members 12A and 12B is described. FIG. 4 is an enlarged perspective view of a principal portion in a state where the backbone member 14 is omitted from the portable information device 10 illustrated in FIG. 1.

As illustrated in FIG. 3, the hinge mechanisms 19 each are disposed at positions overlapping with both end portions in the longitudinal direction of the backbone member 14. The hinge mechanisms 19 are provided at positions located on the outside of the outer shape of the display 16 and are linearly symmetrical with each other. The hinge mechanism 19 has a first hinge chassis 28A, a second hinge chassis 28B, a first arm 30, and a second arm 31.

The first hinge chassis 28A is a part of a thin block shape formed of resin, metal, or the like. The first hinge chassis 28A is fixed onto the inner surface of the first chassis member 12A using fixing screws 32. The second hinge chassis 28B is a part of a thin block shape formed of resin, metal, or the like. The second hinge chassis 28B is fixed onto the inner surface of the second chassis member 12B using the fixing screws 32.

The first hinge chassis 28A has a recessed portion 34 on the rear surface side landing on the inner surface of the first chassis member 12A. The recessed portion 34 has a recessed shape which is opened from the inner side surface (side surface on the Y2 side in the hinge mechanism 19 on the upper side in FIG. 3) of the first hinge chassis 28A to the side surface (side surface on the X2 side) on the bending center C side (also see FIG. 7A to FIG. 8). The second hinge chassis 28B has a recessed portion 35 on the rear surface side landing on the inner surface of the second chassis member 12B. The recessed portion 35 is a recessed shape which is opened from the inner side surface (side surface on the Y2 side in the hinge mechanism 19 on the upper side in FIG. 3) of the second hinge chassis 28B to the side surface (side surface on the X1 side) on the bending center C side (also see FIG. 7A to FIG. 8). The recessed portions 34 and 35 communicate with each other with the bending center C interposed therebetween (see FIG. 3 and FIG. 7B).

Figure 7A:
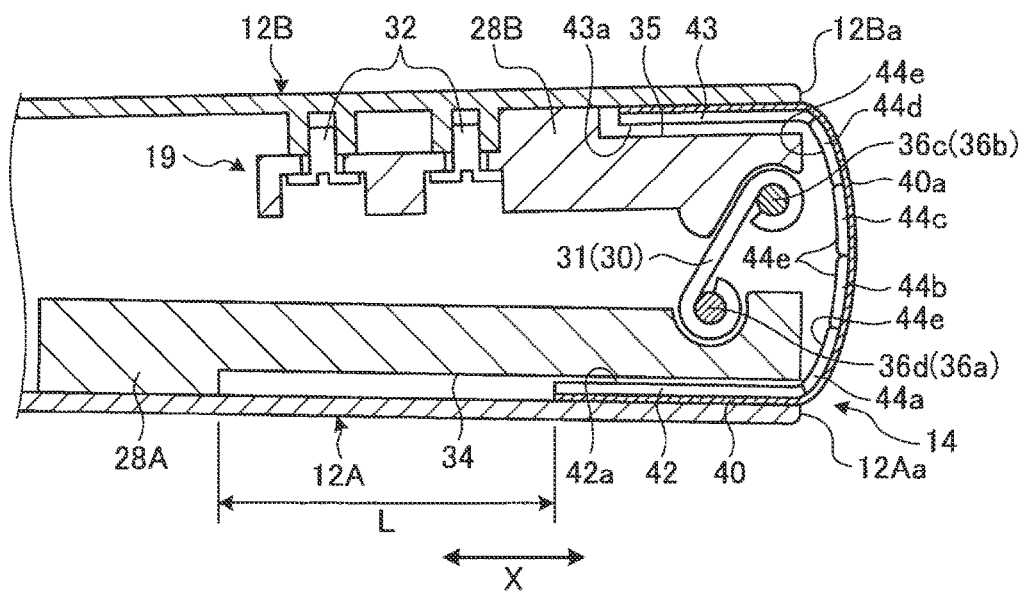
FIG. 7A is a cross-sectional view schematically illustrating the cross-sectional structure along the VIIA-VIIA line in FIG. 1.
Figure 7B:
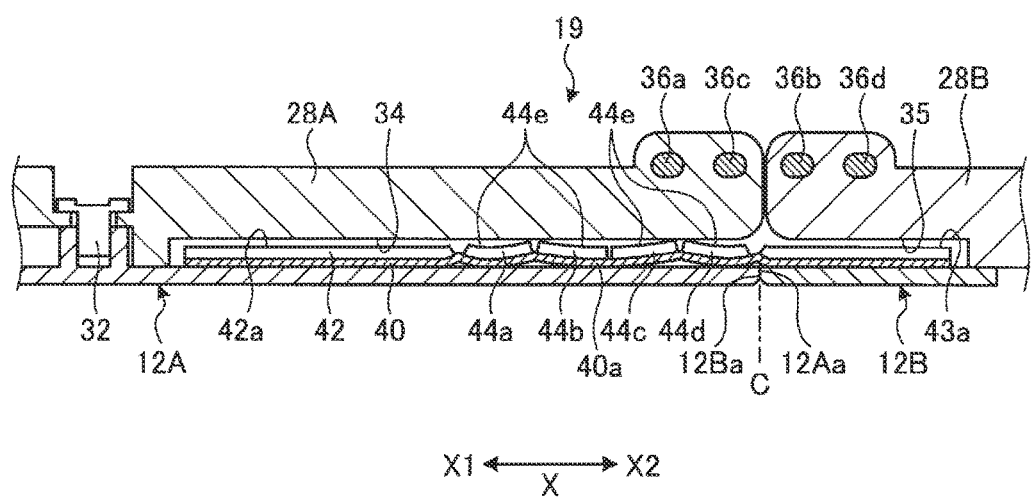
FIG. 7B is a cross-sectional view schematically illustrating the cross-sectional structure along the VIIB-VIIB line in FIG. 3.

While one end portion of the first arm 30 is rotatably connected to the first hinge chassis 28A through a first hinge shaft 36a, the other end portion thereof is rotatably connected to the second hinge chassis 28B through a second hinge shaft 36b (also see FIG. 7A and FIG. 7B). While one end portion of the second arm 31 is rotatably connected to the second hinge chassis 28B through a third hinge shaft 36c, the other end portion is rotatably connected to the first hinge chassis 28A through a fourth hinge shaft 36d (also see FIG. 7A and FIG. 7B).

The first arm 30 and the second arm 31 are arranged in parallel in the Y direction. The second hinge shaft 36b of the first arm 30 is located at a position between the third hinge shaft 36c and the fourth hinge shaft 36d of the second arm 31. The third hinge shaft 36c of the second arm 31 is located at a position between the first hinge shaft 36a and the second hinge shaft 36b of the first arm 30. Thus, the first arm 30 and the second arm 31 are alternately arranged side by side with a positional shift in the X direction and the Y direction.

In each hinge mechanism 19, when the chassis members 12A and 12B are folded centering on the bending center C, the arm members 30 and 31 rotate through the hinge shafts 36a to 36d (see FIG. 4). Thus, the hinge mechanisms 19 connect the chassis members 12A and 12B so as to be rotatable from the state in which the chassis members 12A and 12B are folded into a double-folded state to the state in which the chassis members 12A and 12B are opened into a flat shape.

3. Description of Backbone Member

The backbone member 14 is described. In the storage form illustrated in FIG. 1, inner end surfaces 12Aa and 12Ba of the chassis members 12A and 12B are greatly separated from each other to generate a gap (also see FIG. 4). Then, in the portable information device 10, the backbone member 14 is provided in order to prevent the display 16 and the elements, such as the main substrate 20 and the battery device 26, from being exposed by covering the gap. FIG. 5 is an exploded perspective view of the backbone member 14. FIG. 6A is a cross-sectional view schematically illustrating the cross-sectional structure along the VIA-VIA line in FIG. 1. FIG. 6B is a cross-sectional view schematically illustrating the cross-sectional structure along the VIB-VIB line in FIG. 3.

The backbone member 14 is a thin plate-like member having flexibility serving as the backbone in folding the portable information device 10. The backbone member 14 is provided throughout and between the chassis members 12A and 12B so as to cover the inner end surfaces 12Aa and 12Ba from the inner side while crossing the same (see FIG. 3, FIG. 6A, and FIG. 6B).

As illustrated in FIG. 5, the backbone member 14 has a sheet-like member (flexible sheet-like member) 40, a first support member 42, a second support member 43, and a plurality of reinforcing members 44a, 44b, 44c, and 44d.

The first support member 42 and the second support member 43 are thin plate-like members extending in the longitudinal direction (Y direction) of the backbone member 14. The reinforcing members 44a to 44d are thin plate-like members extending in the longitudinal direction of the backbone member 14 and are narrower in the X direction than the support members 42 and 43. The reinforcing members 44a to 44d are arranged side by side in the X2 direction from the first chassis member 12A to the second chassis member 12B between the support members 42 and 43. The first support member 42, the second support member 43, and the reinforcing members 44a to 44d are thin plate members formed of resin, metal, and the like.

The sheet-like member 40 is a fiber reinforced resin plate in which a thermosetting resin, such as epoxy resin, is impregnated with reinforced fibers, such as carbon fibers. The sheet-like member 40 is a thin sheet-like member of 0.3 mm or less, for example, and has flexibility and high strength. As the reinforced fibers, various materials, such as metal fibers, such as stainless steel fibers, and inorganic fibers, such as glass fibers, may be used. The sheet-like member 40 may be formed of a resin film, metallic foil, and the like.

The support members 42 and 43 and the reinforcing members 44a to 44d are stuck to the surface of the sheet-like member 40 using an adhesive, a double-sided tape, or the like. The support members 42 and 43, and the reinforcing members 44a to 44d, and the sheet-like members 40 may be integrally formed. Thus, the backbone member 14 is bendable in connection with a folding operation of the chassis members 12A and 12B. In the sheet-like member 40, a portion covering the inner end surfaces 12Aa and 12Ba of the chassis members 12A and 12B serves as a bending portion 40a (see FIG. 6A and FIG. 6B). The sheet-like member 40 has a plurality of notch portions 40b arranged side by side in the Y direction in an edge portion on the second support member 43 side.

The first support member 42 is provided slidably in the X direction crossing the chassis members 12A and 12B along the inner surface of the first chassis member 12A on the inner surface side. The first support member 42 has pressing surfaces 42a on the surfaces in both end portions in the longitudinal direction. The pressing surface 42a is a surface one step lower than the other surfaces of the first support member 42. The first support member 42 has a plurality of groove portions 42b in the X direction in the surface of a portion located between the pair of pressing surfaces 42a and 42a in the longitudinal direction. A side surface 42c on the X2 side facing the reinforcing member 44a of the first support member 42 forms an inclined surface retreating in the X1 direction from the reinforcing member 44a side in a direction from the rear surface side (sheet-like member 40 side) to the front surface side (see FIG. 6A and FIG. 6B).

The first support member 42 receives energization force by a tension spring (elastic member) 45 along the X direction (see FIG. 3 and FIG. 6A). The tension spring 45 always energizes the backbone member 14 along the X1 direction in a direction from the second chassis member 12B to the first chassis member 12A.

The second support member 43 is non-slidably attached and fixed to the inner surface of the second chassis member 12B on the inner surface side using a fixing screw 46 (see FIG. 6A and FIG. 6B). The second support member 43 has pressing surfaces 43a on the surfaces in both end portions in the longitudinal direction. The pressing surface 43a is a surface one step lower than the other surfaces of the second support member 43. The second support member 43 has a plurality of groove portion 43b in the X direction in the surface of a portion located between the pair of pressing surfaces 43a and 43a. Through-holes 47 for passing screw portions of the fixing screws 46 are provided at appropriate positions in the longitudinal direction of the second support member 43. The fixing screws 46 are fastened and fixed to the second chassis member 12B through the notch portions 40b of the sheet-like member 40. A side surface 43c on the X1 side facing the reinforcing member 44d of the second support member 43 forms an inclined surface retreating in the X2 direction from the reinforcing member 44d side in a direction from the rear surface side (sheet-like member 40 side) to the front surface side (see FIG. 6A and FIG. 6B).

Each of the reinforcing members 44a to 44d has a trapezoidal cross-sectional shape in which the upper bottom and the lower bottom are somewhat curved. A pressing surface 44e which is a surface one step lower than the other surfaces is provided on the surfaces in both end portions in the longitudinal direction of each of the reinforcing members 44a to 44d (see FIG. 5). Each of the pressing surfaces 44e is formed at substantially the same height as that of the pressing surfaces 42a and 43a of the support member 42 and 43 (see FIG. 7B). The number of the reinforcing members 44a to 44d can be changed as appropriate.

Each of the reinforcing members 44a to 44d has a side surface 48a on the first support member 42 side (X1 side) and a side surface 48b on the second support member 43 side (X2 side) (see FIG. 6A and FIG. 6B). The two reinforcing members 44a and 44b close to the first support member 42 side, and the two reinforcing members 44c and 44d close to the second support member 43 side, are substantially linearly symmetrical with each other about the boundary between the reinforcing members 44b and 44c at the center. The side surface 48a of the reinforcing member 44a forms an inclined surface retreating in the X2 direction from the first support member 42 side in a direction from the rear surface side (sheet-like member 40 side) to the front surface side. The side surface 48b of the reinforcing member 44d forms an inclined surface retreating in the X1 direction from the second support member 43 side in a direction from the rear surface side (sheet-like member 40 side) to the front surface side. The other side surfaces 48a and 48b face the facing side surfaces 48b and 48a, respectively, substantially in parallel to each other or form an inclined surface in a direction of somewhat separating from each other.

In the storage form illustrated in FIG. 6A, the side surfaces 48a and 48b of the reinforcing members 44a to 44d abut on each other on the inner surface side of the bending portion 40a of the sheet-like member 40 bent into a double-folded state to form an arch shape (arc shape) similar to a shape in which a plurality of teeth are arranged side by side without a gap. Herein, the side surfaces 48a and 48b of the reinforcing members 44a and 44d in both ends abut on the side surfaces 42c and 43c of the support member 42 and 43, respectively. Due to the arch shape, the inner end surfaces 12Aa and 12Ba are separated from each other, so that the reinforcing members 44a to 44d function as supports firmly supporting the chassis members 12A and 12B in the storage form with reduced rigidity. More specifically, in the vicinity of the backbone member 14 between the chassis members 12A and 12B, the hinge mechanisms 19 are provided in both end portions in the Y direction in the storage form but, in portions other than the both end portions, a portion having no rigidity extends in the Y direction. In the portable information device 10, the support members 42 and 43 and the reinforcing members 44a to 44b form supports of an arch shape extending in the Y direction to secure the rigidity in the thickness direction in the storage form.

In such a storage form, the inner end surfaces 12Aa and 12Ba of the chassis members 12A and 12B are disposed at the most separated positions. Therefore, the backbone member 14 is positioned at a retreated position where the first support member 42 side, which is the slide side, is drawn to the most inner end surface 12Aa side (X2 direction) on the inner surface of the first chassis member 12A. Herein, the first support member 42 slides to the inner end surface 12Aa side against the energization force of the tension spring 45.

On the other hand, in the usage form in which the chassis members 12A and 12B are opened into a flat shape, the reinforcing members 44a to 44d are disposed side by side in one row together with the support members 42 and 43 on the inner surfaces of the chassis members 12A and 12B. Therefore, the backbone member 14 takes a form of a flat shape having the minimum thickness. In the usage form, the inner end surfaces 12Aa of the chassis members 12A and 12B and 12Ba are disposed at positions where the inner end surfaces 12Aa are most close to or abut on each other. Therefore, the backbone member 14 is located at an advance position where the first support member 42 side, which is the slide side, advances to the outer end surface 12Ab side (X1 direction) opposite to the most inner end surface 12Aa side on the inner surface of the first chassis member 12A. Herein, the first support member 42 smoothly slides to the outer end surface 12Ab side by the energization force of the tension spring 45, and therefore the backbone member 14 does not cause floating or catching in sliding.

4. Description of Relationship Between Backbone Member and Hinge Mechanism

The relationship between the backbone member 14 and the hinge mechanism 19 is described. FIG. 7A is a cross-sectional view schematically illustrating the cross-sectional structure along the VIIA-VIIA line in FIG. 1. FIG. 7B is a cross-sectional view schematically illustrating the cross-sectional structure along the VIIB-VIIB line in FIG. 3. FIG. 8 is a cross-sectional view schematically illustrating the cross-sectional structure along the VIII-VIII line in FIG. 2.

As illustrated in FIG. 1 and FIG. 4, the backbone member 14 extends to a position where the backbone member 14 covers the rear surface side of each of the hinge mechanisms 19 to prevent the hinge mechanisms 19 from exposing from between the inner end surfaces 12Aa and 12Ba of the chassis members 12A and 12B.

As illustrated in FIG. 3, FIG. 7A, FIG. 7B, and FIG. 8, the pressing surfaces 42a, 43a, and 44e in both end portions in the longitudinal direction of the backbone member 14 are held between the rear surfaces of the hinge chassis 28A and 28B and the inner surfaces of the chassis members 12A and 12B. Specifically, the pressing surfaces 42a, 43a, and 44e of the backbone member 14 are inserted and disposed in the recessed portions 34 and 35 of the hinge chassis 28A and 28B. Herein, at least the pressing surfaces 42a and 44e of the first support member 42 and the reinforcing members 44a to 44d are slidably held within the recessed portion 34 of the first support member 42 and are guided between the inner surface of the first chassis 12A and the top surface of the recessed portion 34. More specifically, the recessed portion 34 on the first hinge chassis 28A side guides the backbone member 14 so as to be slidable in the X direction and prevents floating or the like in sliding. The recessed portion 34 has a length dimension capable of coping with a slide distance (slide range) (see FIG. 7A) L of the backbone member 14. Therefore, the recessed portion 34 is longer in the X direction than the recessed portion 35 on the second hinge chassis 28B side.

As illustrated in FIG. 8, the hinge mechanisms 19 each have an engagement protruding portion 50 in the outer surface of each of the hinge chassis 28A and 28B. On the other hand, engagement recessed portions 52a are formed in the internal surfaces of wall portions 52 which are the side walls along the X direction raised from the inner surfaces of the chassis members 12A and 12B facing the engagement protruding portions 50. The engagement recessed portion 52a allows the engagement of the engagement protruding portion 50 and regulates at least the movement in a direction where the engagement protruding portion 50 raises from the inner surfaces of the chassis members 12A and 12B.

Therefore, the first hinge chassis 28A is held between the inner surface of the first chassis member 12A and the top surface of the engagement recessed portion 52a of the wall portion 52 to be prevented from floating. The second hinge chassis 28B is held between the inner surface of the second chassis member 12B and the top surface of the engagement recessed portion 52a of the wall portion 52 to be prevented from floating. More specifically, the hinge chassis 28A and 28B are provided with the recessed portions 34 and 35 into which the backbone member 14 is inserted on the rear surface sides, and therefore the fixing screws 32 can be fastened only around the recessed portions 34 and 35. Therefore, there is a concern that the hinge chassis 28A and 28B cause floating in the movement of the hinge mechanisms 19. Thus, in the portable information device 10, the hinge chassis 28A and 28B are engaged with and pressed against the wall portions 52 of the chassis members 12A and 12B to prevent the hinge chassis 28A and 28B from floating. The hinge chassis 28A and 28B may be engaged with the engagement recessed portion 52a without providing the engagement protruding portions 50.

5. Description of Wiring Line Structure

Figure 9A:
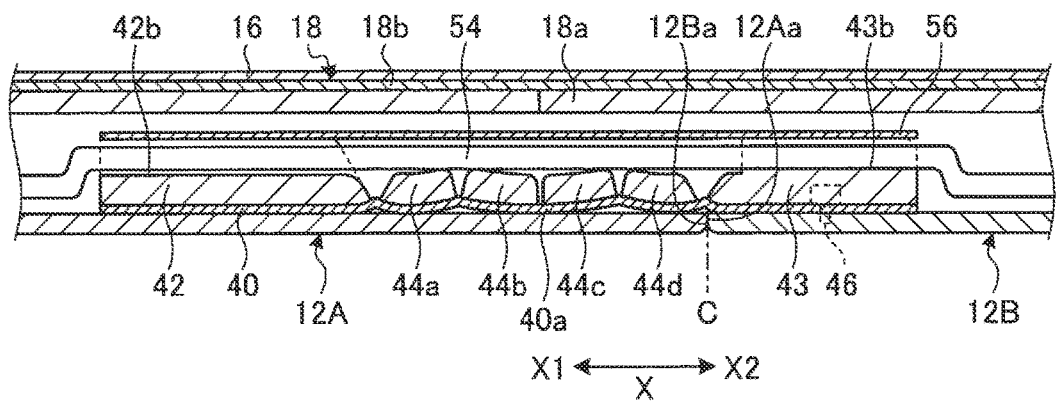
FIG. 9A is an enlarged cross sectional view of a principal portion schematically illustrating the cross-sectional structure along a direction in which groove portions of the backbone member are arranged.
Figure 9B:
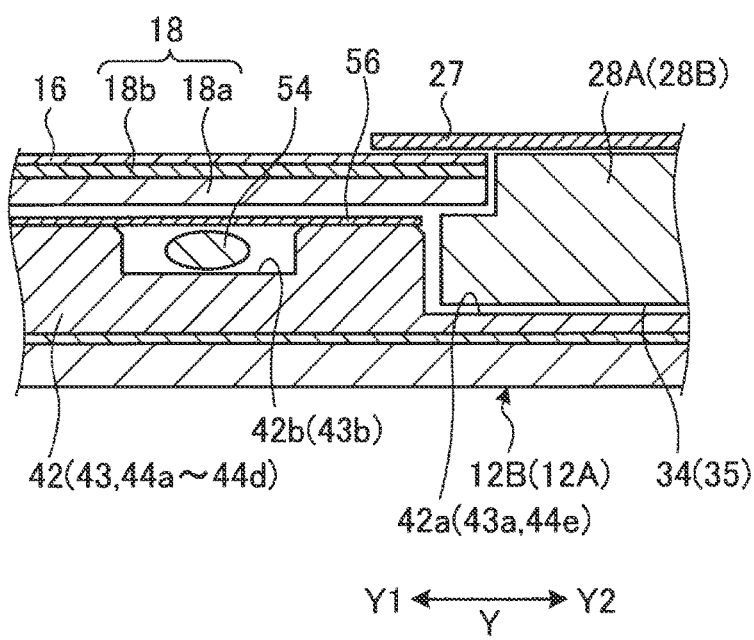
FIG. 9B is an enlarged cross sectional view of a principal portion schematically illustrating the cross-sectional structure along the longitudinal direction of the backbone member.

The wiring line structure of the portable information device 10 is described. The portable information device 10 adopts the configuration in which the portable information device 10 can be folded into a double-folded state. Therefore, an electronic substrate or electronic components are disposed as appropriate on the inner surfaces of the chassis members 12A and 12B on the right side and the left side, and wiring lines connecting the same need to be provided through the inner surface side of the backbone member 14 to be bent. Therefore, there is a concern that the wiring lines cause a positional shift in opening/closing of the chassis members 12A and 12B to cause defects, such as clamping or disconnection, and thus it is desirable to prevent the positional shift of the wiring lines. FIG. 9A is an enlarged cross sectional view of a principal portion schematically illustrating the cross-sectional structure along the X direction of the groove portions 42b and 43b of the backbone member 14 (X direction). FIG. 9B is an enlarged cross sectional view of a principal portion schematically illustrating the cross-sectional structure along the longitudinal direction (Y direction) of the backbone member 14.

As illustrated in FIG. 3, FIG. 9A, and FIG. 9B, between the first chassis member 12A and the second chassis member 12B, a plurality of wiring lines 54 for electrically connecting the main substrate 20 and the sub-substrate 24, for example, is provided. The wiring lines 54 are wired crossing the chassis members 12A and 12B crossing the inner surface side of the backbone member 14. The wiring lines 54 are inserted into the groove portions 42b and 43b in the X direction formed in the support members 42 and 43 of the backbone member 14. In the backbone member 14, the height positions of the surfaces of the reinforcing members 44a to 44b are substantially in agreement with the height positions of the bottom surfaces of the groove portions 42b and 43b (see FIG. 9A).

Therefore, the wiring lines 54 are stably held in the state of being inserted into the groove portions 42b and 43b. Accordingly, the occurrence of defects, such as a positional shift, in opening/closing of the chassis members 12A and 12B is prevented. More specifically, also when the backbone member 14 slides with an opening/closing operation of the chassis members 12A and 12B, the wiring lines 54 slide within the groove portions 42b and 43b, and therefore the occurrence of defects, such as a positional shift or clamping, is prevented. The wiring lines 54 may be positioned and fixed to one of the chassis members 12A and 12B outside either the groove portion 42b or 43b, for example.

As illustrated in FIG. 9A and FIG. 9B, upper openings of the groove portions 42b and 43b are covered with the rear surface of the support plate 18. Therefore, the wiring lines 54 can be prevented from floating from the upper openings of the groove portions 42b and 43b and falling off on the outside of the groove portions 42b and 43b. Furthermore, in this embodiment, as illustrated in FIG. 9A and FIG. 9B, a lid member 56 closing the openings of the groove portions 42b and 43b is provided to more certainly prevent the falling off of the wiring lines 54 from the groove portions 42b and 43b.

The lid member 56 is a thin film containing materials having flexibility, such as a thin resin film or metallic foil. The lid member 56 is provided over substantially the entire length excluding both end portions in the Y direction of the backbone member 14, and over the entire width in the X direction thereof, and is pasted to the surface of the backbone member 14. In the case of this embodiment, a sheet-like member containing stainless steel (stainless steel sheet) is used for the lid member 56. An end portion (one end portion) on the X2 side of the lid member 56 is stuck to the surface of the second support member 43 and an end portion (other end portion) on the X1 side thereof is movably placed on the surface of the first support member 42, for example (see FIG. 6A and FIG. 6B). Therefore, the lid member 56 prevents the falling off of the wiring lines 54 from the groove portions 42b and 43b while sliding on the backbone member 14 following the slide of the backbone member 14. The lid member 56 may be omitted and the plate member 18a may be used as a substitute for the lid member 56.

6. Description of Operational Effects of Portable Information Device

As described above, the portable information device 10 according to this embodiment has the backbone member 14 provided throughout and between the inner surface of one edge portion of the first chassis member 12A and the inner surface of one edge portion of the second chassis member 12B so as to cover a gap between the one edge portion of the first chassis member 12A and the one edge portion of the second chassis member 12B connected by the hinge mechanisms 19. The backbone member 14 is provided to the inner surface of the one edge portion of the first chassis member 12A so as to be slidable along the X direction from the second chassis member 12B to the first chassis member 12A along the inner surface and is non-slidably fixed to the inner surface of the one edge portion of the second chassis member 12B.

Therefore, the backbone member 14 can cover a gap generated between edge portions on the hinge sides of the chassis members 12A and 12B (between inner end surfaces 12Aa and 12Ba) when the first chassis member 12A and the second chassis member 12B are folded into a double-folded state through the hinge mechanisms 19. Therefore, the internal elements, such as the main substrate 20, can be prevented from being exposed from the gap, so that the appearance quality and the durability of products can be improved. Moreover, one edge portion of the backbone member 14 is slidably provided to the first chassis member 12A and the other edge portion is fixed to the second chassis member 12B. Thus, the backbone member 14 slides following an opening/closing operation of the first chassis member 12A and the second chassis member 12B by the hinge mechanisms 19. Therefore, when the two chassis members 12A and 12B are opened into a flat shape, so that a gap therebetween decreases, the backbone member 14 can be prevented from causing floating, a positional shift, or the like within the chassis members 12A and 12B.

Herein, in the portable information device 10, the backbone member 14 is non-slidably fixed on the second chassis member 12B side on which the battery device 26 is mounted. More specifically, particularly the battery device 26 among the elements mounted in the portable information device 10 has been desired to be enlarged as much as possible in order to cope with high capacity and is difficult to be formed into a special shape as compared with the main substrate 20 and the like. Then, by setting an edge portion on the battery device 26 side of the backbone member 14 as the fixation side, there is no necessity of securing the slide distance L on the battery device 26 side, which can contribute to a size reduction as the entire device. It is a matter of course that the setting of the slide side and the fixation side of the backbone member 14 can be changed as appropriate.

The backbone member 14 has the sheet-like member 40 which is a flexible sheet-like member bendable into a double-folded state and the reinforcing members 44a to 44b stuck to the inner surface of the sheet-like member 40 and extending in the Y direction along one edge portions of the first chassis member 12A and the second chassis member 12B. Thus, the backbone member 14 can reinforce a portion covering a gap between the chassis members 12A and 12B folded into a double-folded state with the reinforcing members 44a to 44d. Therefore, the backbone member 14 can be prevented from being deformed by receiving external force and causing a breakage or the like in the internal elements, such as the main substrate 20. Moreover, the reinforcing members 44a to 44d are stuck to the sheet-like member 40, and therefore a smooth bending operation of the backbone member 14 can be prevented from being blocked. It is a matter of course that, even when the reinforcing members 44a to 44d are omitted and the backbone member 14 contains only the sheet-like member 40, the effect of covering the gap between the chassis members 12A and 12B can be secured.

The plurality of reinforcing members 44a to 44d form the arch shape in which the side surfaces 48a and 48b abut on each other on the inner surface side of the bending portion 40a of the sheet-like member 40 bent into a double-folded state. Thus, the reinforcing members 44a to 44d function as supports firmly supporting the folded chassis members 12A and 12B. Therefore, the rigidity in the thickness direction of the portable information device 10 can be secured, so that the folded chassis members 12A and 12B can be prevented from being crushed by external force and causing a breakage or the like in the internal elements and the like of the display 16.

In the portable information device 10, the lid member 56 containing metallic foil closes the groove portions 42b and 43b to prevent falling off of the wiring lines 54. Therefore, when the portable information device 10 is changed from the storage form illustrated in FIG. 6A to the usage form illustrated in FIG. 6B, for example, the lid member 56 is also bent together with the backbone member 14 so as to follow the bending operation of the pair of plate members 18a and 18a of the support plate 18. As a result, the wiring lines 54 can be certainly prevented from contacting adjacent end portions (edge) between the plate members 18a and 18a and the like, so that the durability and the reliability of the portable information device 10 are improved. The end portion on the X1 side which is the end portion on the slide side of the lid member 56 may be configured so as to extend beyond the end portion on the X1 side of the first support member 42. Thus, the wiring lines 54 can be protected in a region larger than a region where the wiring lines 54 overlap with the backbone member 14.

7. Description of Modification

Figure 10A:
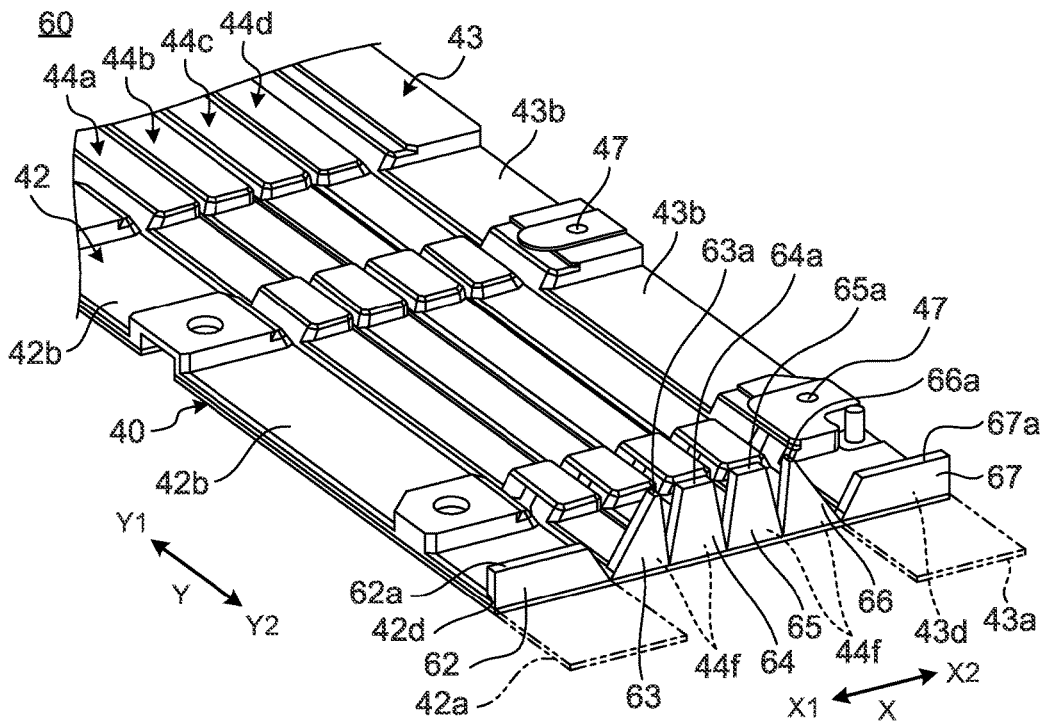
FIG. 10A is an enlarged perspective view of a principal portion illustrating a state in a usage form of a backbone member according to a modification.
Figure 10B:
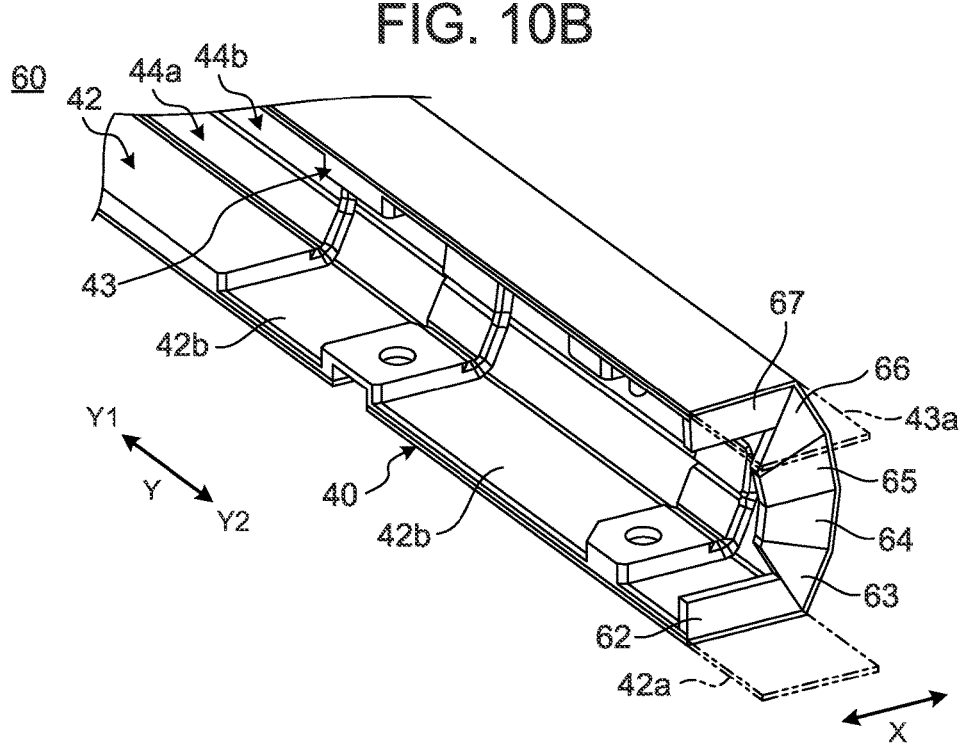
FIG. 10B is an enlarged perspective view of a principal portion illustrating a state where the backbone member illustrated in FIG. 10A is brought into a storage form.
Figure 11A:
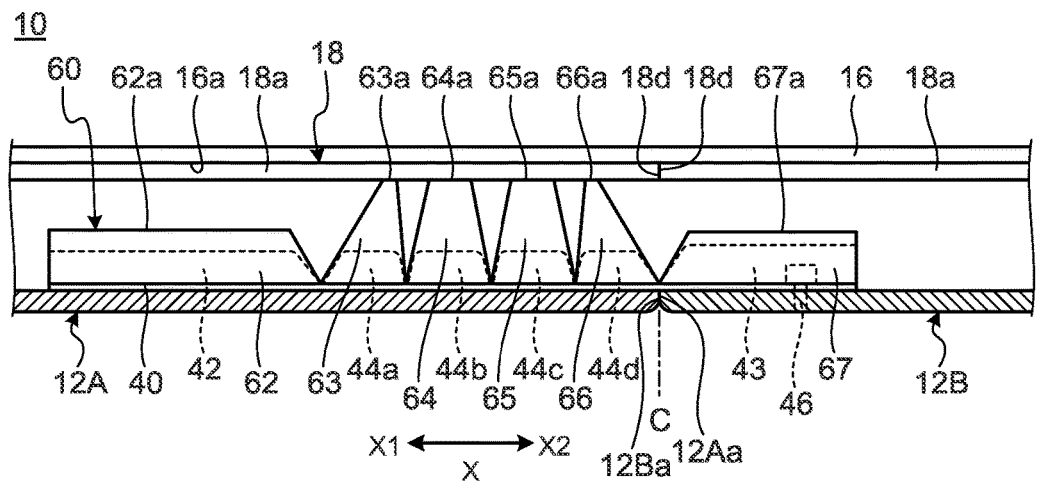
FIG. 11A is a cross-sectional view schematically illustrating the cross-sectional structure in the usage form of the portable information device provided with the backbone member illustrated in FIG. 10A.
Figure 11B:
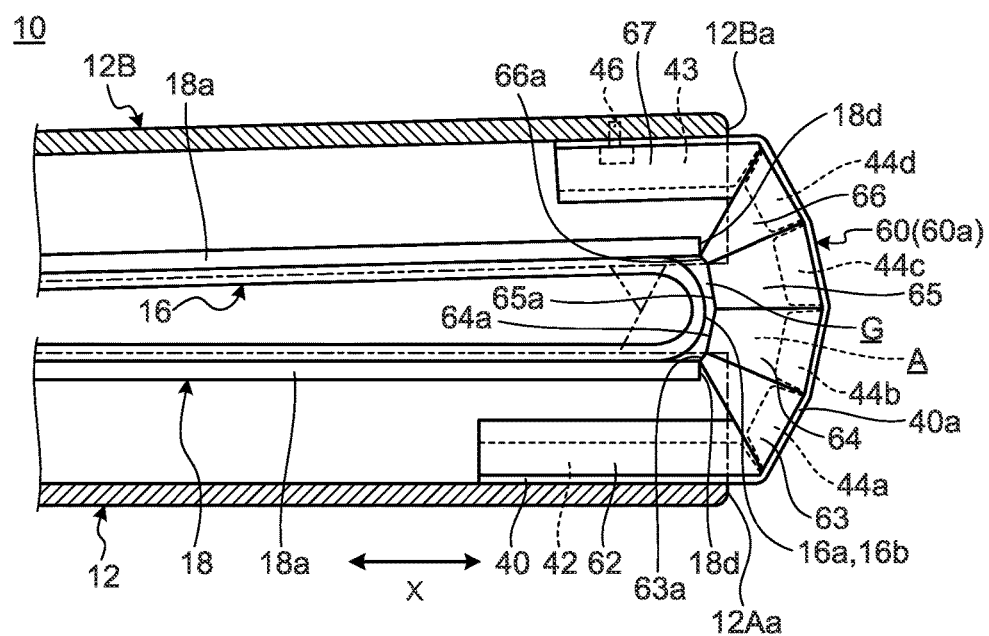
FIG. 11B is a cross-sectional view schematically illustrating the cross-sectional structure in the storage form of the portable information device 10 provided with the backbone member illustrated in FIG. 10B.
Figure 12:
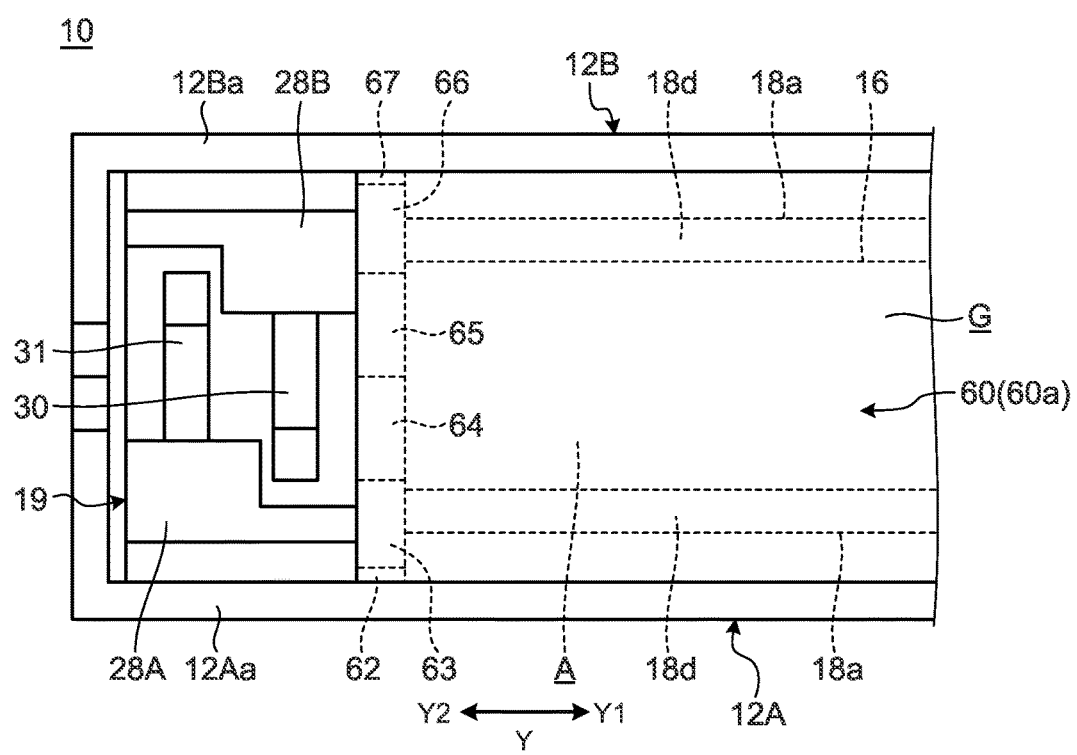
FIG. 12 is a side view in which the portable information device illustrated in FIG. 11B is viewed from the backbone member side.

A backbone member 60 according to a modification is described. FIG. 10A is an enlarged perspective view of a principal portion illustrating a state in a usage form of the backbone member 60 according to the modification. FIG. 10B is an enlarged perspective view of a principal portion illustrating a state where the backbone member 60 illustrated in FIG. 10A is brought into a storage form. FIG. 11A is a cross-sectional view schematically illustrating the cross-sectional structure in the usage form of the portable information device 10 provided with the backbone member 60 illustrated in FIG. 10A. FIG. 11B is a cross-sectional view schematically illustrating the cross-sectional structure in the storage form of the portable information device 10 provided with the backbone member 60 illustrated in FIG. 10B. FIG. 12 is a side view in which the portable information device 10 illustrated in FIG. 11B is viewed from the backbone member 60 side. In FIG. 10A to FIG. 12, the same reference numerals as the reference numerals illustrated in FIG. 1 to FIG. 9B denote the same or similar configurations, and therefore the same or similar functions and effects are exhibited, and thus a detailed description thereof is omitted. In FIG. 11A and FIG. 11B, the sheet-like member 18b, the tension spring 45, and the like are omitted.

As illustrated in FIG. 10A and FIG. 10B, the backbone member 60 has wall members 62, 63, 64, 65, 66, and 67 on both end portions in the longitudinal direction (Y direction). Although FIG. 10A and FIG. 10B illustrate only the end portion on the Y2 side of the backbone member 60, the wall members 62 to 67 are provided also in the end portion on the Y1 side.

The wall member 62 is provided in a side portion 42d of the first support member 42 and projects toward a rear surface 16a of the display 16 (see FIG. 11A). The wall member 67 is provided in a side portion 43d of the second support member 43 and projects toward the rear surface 16a of the display 16. The wall members 62 and 67 are projection pieces formed of a trapezoidal thin plate and individually have the outer shape in which the cross-sectional shape of each of the support members 42 and 43, respectively, is extended upward.

The wall members 63 to 66 are individually provided in side portions 44f of the reinforcing members 44a to 44d and project toward the rear surface 16a of the display 16 (see FIG. 11A). The wall members 63 and 64 on the first support member 42 side and the wall members 65 and 66 on the second support member 43 side are symmetrical to each other with respect to the boundary line between the center wall members 64 and 65 as the reference. The wall members 63 to 66 are projection pieces formed of a trapezoidal thin plate and individually have the outer shape in which the cross-sectional shape of each of the reinforcing members 44a to 44d, respectively, is extended upward. Top surfaces 63a and 66a of the wall members 63 and 66, respectively, on the outside have a substantially triangular shape with a narrow width. Top surfaces 64a and 65a of the wall members 64 and 65, respectively, on the center side have a trapezoidal shape wider than the top surfaces 63a and 66a. The top surfaces 63a to 66a have projection height larger than that of the top surfaces 62a and 67a of the wall members 62 and 67, respectively, on both the ends.

In the case of this embodiment, the support members 42 and 43 and the reinforcing members 44a to 44d are formed of resin materials, such as POS and ABS, for example. The wall members 62 to 67 may be integrally molded with the support members 42 and 43 and the reinforcing members 44a to 44d or may be separately formed and attached with an adhesive or the like.

As with the backbone member 14 illustrated in FIG. 5, the backbone member 60 is provided with the pressing surfaces 42a and 43a in end portions of the support members 42 and 43, respectively. The wall members 62 and 67 are provided in side portions 42d and 43d serving as the bases of the pressing surfaces 42a and 43a, respectively. Although FIG. 10A and FIG. 10B illustrate the configuration in which the pressing surfaces 42a and 43a are provided only in the support members 42 and 43 on both the ends, a configuration may be acceptable in which the pressing surfaces 44e are provided in the side portions 44f of the reinforcing members 44a to 44d as with the backbone member 14 illustrated in FIG. 5. Thus, the wall members 62 to 67 are disposed at the positions on the inside of the hinge mechanism 19 in the Y direction and are disposed at the positions overlapping with a rear surface 18c of the support plate 18 as viewed in plan.

The portable information device 10 provided with such a backbone member 60 is brought into a state where the backbone member 60 is formed in a flat shape and the wall members 62 to 67 are arranged side by side in a line in the horizontal direction in the usage form illustrated in FIG. 10A and FIG. 11A. At this time, the top surfaces 63a to 66a of the four central wall members 63 to 66, respectively, abut on the rear surface 18c of the plate member 18a on the first chassis member 12A side to support the same. More specifically, the wall members 63 to 66 function as a support reinforcing the support plate 18 (display 16) from the rear surface side in the usage form of the portable information device 10. FIG. 11A illustrates the configuration in which the wall members 63 to 66 are disposed at the positions where the wall members 63 to 66 support only the plate member 18a on the first chassis member 12A side. However, the wall members 63 to 66 may be disposed at the positions where the wall members 63 to 66 support the plate member 18a on the second chassis member 12B side together with or in place of the plate member 18a on the first chassis member 12A side.

When the portable information device 10 in the usage form is folded into the storage form as illustrated in FIG. 10B, FIG. 11B, and FIG. 12, a gap G between the inner end surfaces 12Aa and 12Bb of the chassis members 12A and 12B, respectively, extends. Thus, the backbone member 60 forms a bent portion 60a which projects rearward from the gap G and is bent as with the above-described backbone member 14. Herein, the backbone member 60 is a belt-like, plate-like member having flexibility, and therefore an arcuate opening A is formed in a side portion (side portion in the Y direction) of the bent portion 60a. The opening A projects rearward from the inner end surfaces 12Aa and 12Ba of the chassis members 12A and 12B, respectively, and is opened toward the outside of the chassis members 12A and 12B. Specifically, the opening A is a gap formed between the reinforcing members 44a to 44d indicated by the dashed lines in FIG. 11B and the rear surface 16a of the display 16 and is the same as that formed in a bent portion of the backbone member 14 in FIG. 1 and FIG. 6A.

In the backbone member 60, the wall members 62 to 67 are formed to erect in the side portions 42d, 43d, and 44f thereof. Therefore, the wall members 62 to 67 close the opening A in a side portion of the bent portion 60a of the backbone member 60 in the portable information device 10 as illustrated in FIG. 10B, FIG. 11B, and FIG. 12. More specifically, the wall members 62 to 67 close the edge (opening A) of the backbone member 60 curved in a semicircular shape. Thus, the opening A of the bent portion 60a can also be closed in addition to the closing action between the chassis members 12A and 12B by the backbone member 60, so that the entering of foreign substances into the chassis can be more certainly prevented in the portable information device 10 provided with the backbone member 60. As a result, it can be more certainly prevented that foreign substances enter between a bent portion 16b of the display 16 and an end surface 18d of each plate member 18a of the display which is widely opened in the storage form as illustrated in FIG. 11B, and then the foreign substances are put between each plate member 18a and the display 16 in the usage form.

As illustrated in FIG. 12, the hinge mechanism 19 is disposed at the position on the outer side relative to the backbone member 60 in the Y direction in the portable information device 10. Therefore, the foreign substances are prevented from entering the chassis from this portion. It is a matter of course that a configuration may be acceptable in which the backbone member 60 is extended to a position where the backbone member 60 covers the hinge mechanism 19, so that the inner end surfaces 12Aa and 12Ba of the chassis members 12A and 12B, respectively, are covered by the backbone member 60 and the wall members 62 to 67 in the entire length in the Y direction.

The wall members 62 to 67 may contain only portions corresponding to the bent portions 16b and 60a, i.e., wall members 63 to 66. Even when the wall members 62 to 67 contain only a part of the wall members 63 to 66, the foreign substance entrance prevention effect described above can be obtained. More specifically, the wall members 62 to 67 may close at least one part of the opening A of the bent portion 60a of the backbone member 60 projecting from the chassis members 12A and 12B. However, particularly in the case of a configuration in which the top surfaces 63a to 66a of the wall members 63 to 66 are disposed at the positions close to the rear surface 16a of the bent portion 16b of the display 16, so that the gap between the wall members 62 to 67 is eliminated as illustrated in FIG. 11B, not only foreign substances but liquid and the like can be prevented from entering the chassis, and thus high shielding performance is obtained.

As illustrated in FIG. 11A and FIG. 11B, the wall members 62 and 67 on both the ends are configured to be lower than the other wall members 63 to 66 because there is also a concern that the area of the opening A to be closed by the wall members 62 and 67 is small and this portion interferes with other components (main substrate 20 and battery device 26) disposed in the chassis members 12A and 12B. The wall members 62 and 67 may be omitted depending on the projection degree of the bent portion 60a from the inner end surfaces 12Aa and 12Ba of the chassis members 12A and 12B, respectively, and may be configured to be approximately as high as the wall members 63 to 66, for example.

The wall members 62 to 67 may be configured by sponge or the like, for example, other than a plate piece. The wall members 62 to 67 may be provided not only in both the side portions of the backbone member 60 but over the entire length in the Y direction. The wall members 62 to 67 may be configured to be provided on the chassis members 12A and 12B side and move forward and rearward so as to close the opening A of the bent portion 60a when the chassis members 12A and 12B are folded, for example.

8. Description of Modification

Figure 13:
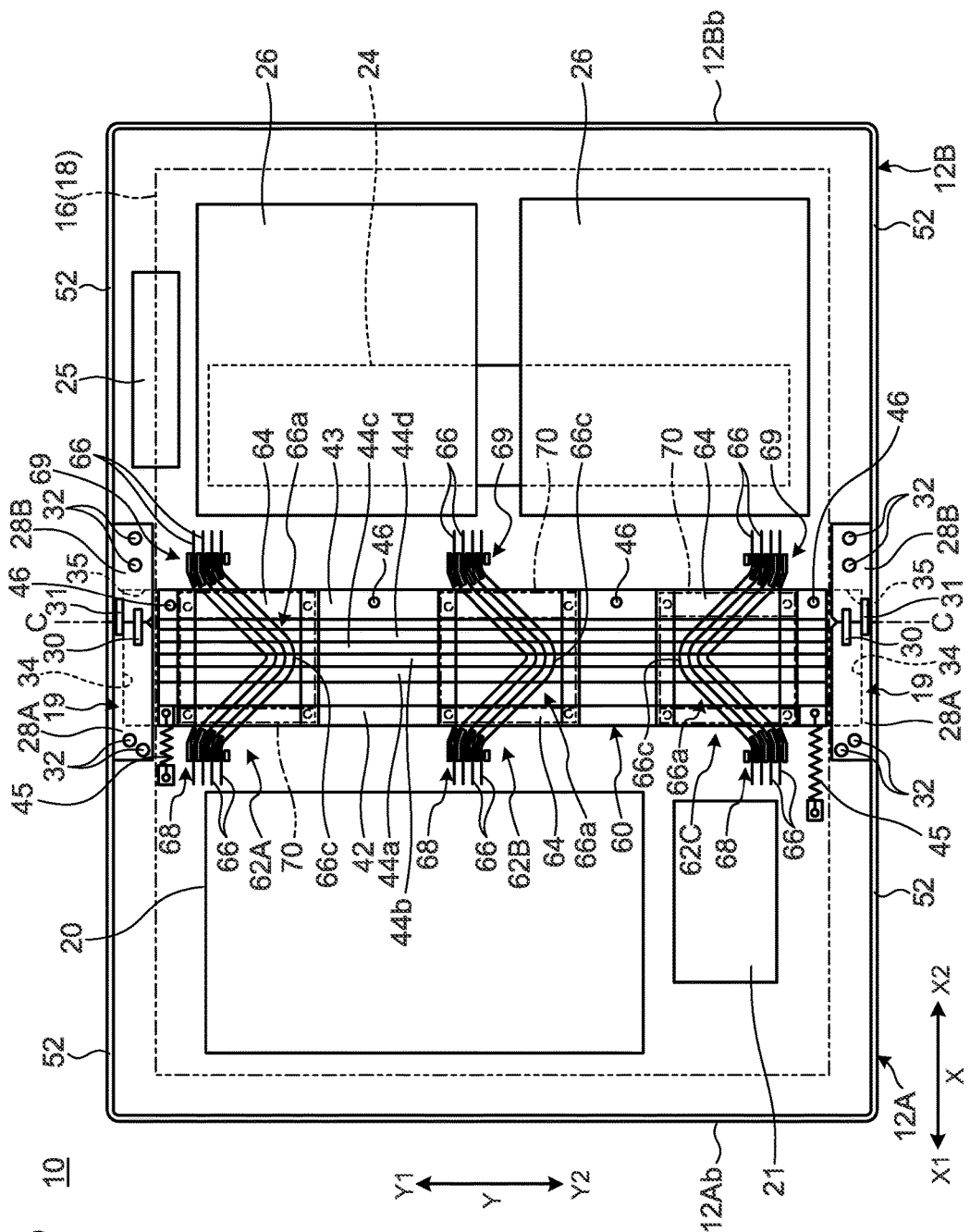
FIG. 13 is a plan view schematically illustrating the internal structure of a portable information device using a wiring line structure according to a modification.

A wiring line structure according to a modification is described. FIG. 13 is a plan view schematically illustrating the internal structure of the portable information device 10 using the wiring line structure according to the modification. In FIG. 13, the same reference numerals as the reference numerals illustrated in FIG. 1 to FIG. 9B denote the same or similar configurations, and therefore the same or similar functions or effects are exhibited, and thus a detailed description thereof is omitted. The same also applies to FIG. 14A to FIG. 15B.

As illustrated in FIG. 13, the wiring line structure according to this modification has a backbone member 60 different in configuration from the backbone member 14 illustrated in FIG. 3 and wiring line structure portions 62A, 62B, and 62C. Although the shapes and the arrangement of the main substrate 20, the communication module 21, the sub substrate 24, and the battery device 26 are changed in the configuration example illustrated in FIG. 13 as compared with the configuration example illustrated in FIG. 3, the arrangement and the shapes of the components can be changed as appropriate.

Although the backbone member 60 is different from the backbone member 14 illustrated in FIG. 3 in having groove portions 64 different in shape from the groove portions 42b and 43b, the fundamental configuration provided with the support members 42 and 43 and the reinforcing members 44a to 44b is the same. The groove portions 64 are provided at three places in the Y direction of the backbone member

60. Although each groove portion 64 is obtained by digging the backbone member 60 into a recessed shape along the X direction as with the groove portions 42b and 43b illustrated in FIG. 3, the width size in the Y direction is larger than that of the groove portions 42b and 43b. Each groove portion 64 is obtained by partially denting each of the support member 42 and 43 and each of the reinforcing member 44a to 44b (see FIG. 15A). Also in the backbone member 60, when the height of the reinforcing members 44a to 44d is smaller than that of the support members 42 and 43, the dent may not be provided in the reinforcing members 44a to 44d as with the case of the backbone member 14 and the upper surfaces thereof may be used as the bottom surfaces of the groove portions 64.

Each of the wiring line structure portions 62A to 62C has the groove portion 64, wiring lines 66 inserted into the groove portion 64, a pair of fixing portions 68 and provided crossing the backbone member 60 in the X direction, and a lid member 70 closing the groove portion 64.

Figure 14A:
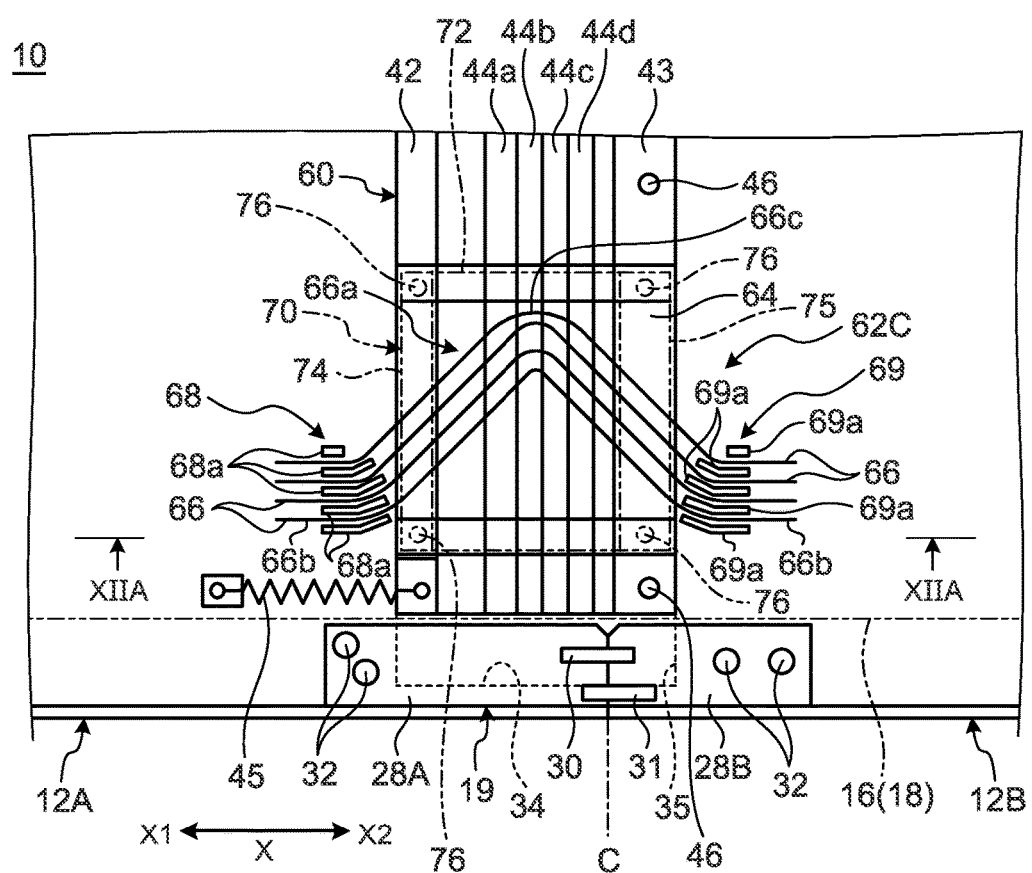
FIG. 14A is a plan view in which a wiring line structure portion illustrated in FIG. 13 is enlarged.
Figure 14B:
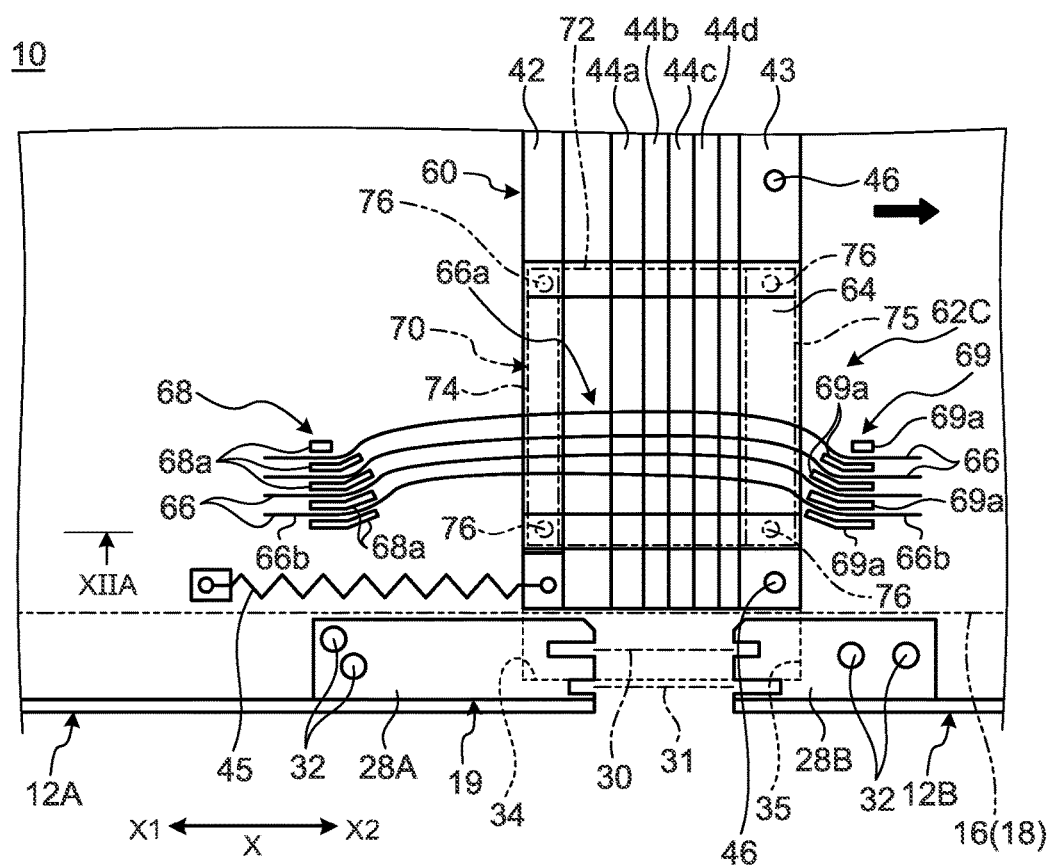
FIG. 14B is a developed view illustrating the state of the wiring line structure portion when the chassis members illustrated in FIG. 14A are closed to bring the portable information device is brought into a storage form.
Figure 15A:
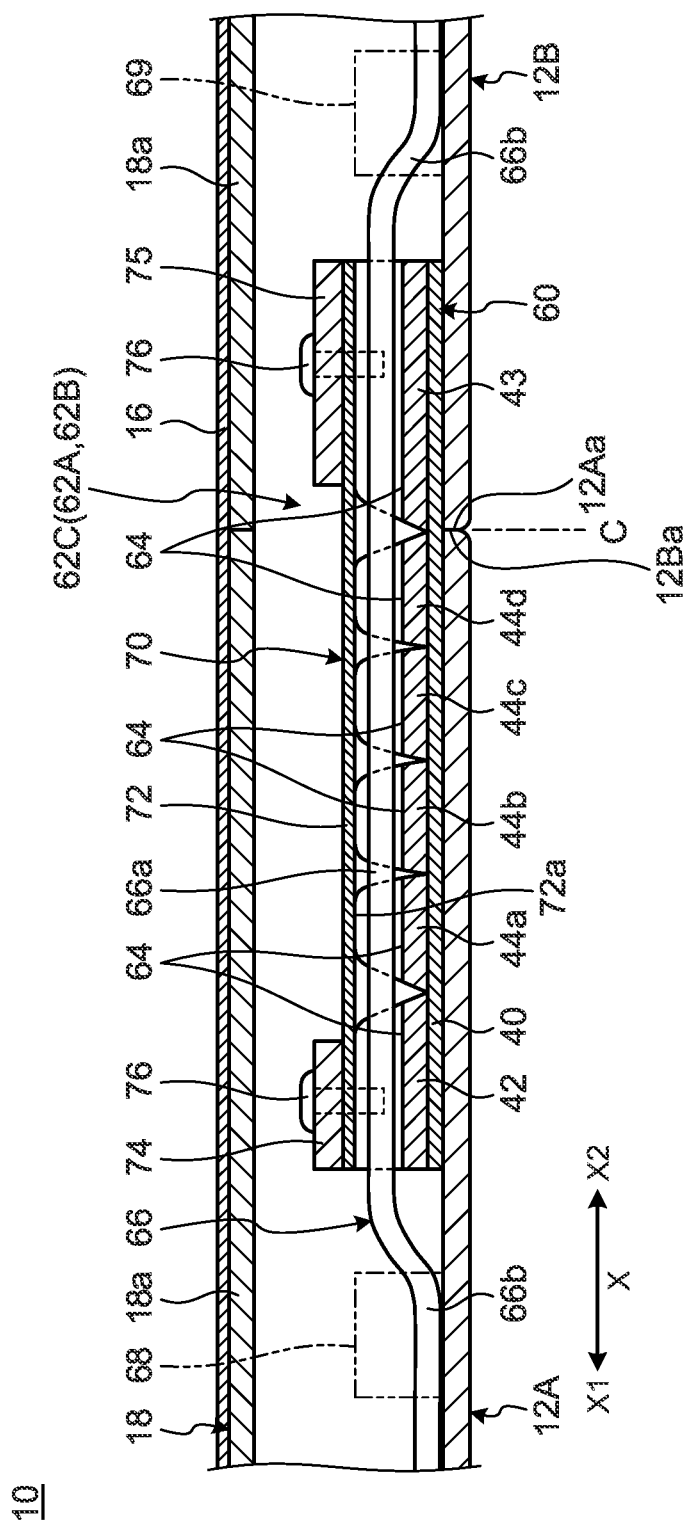
FIG. 15A is a schematic cross-sectional view along the XIIA-XIIA line in FIG. 14A.
Figure 15B:
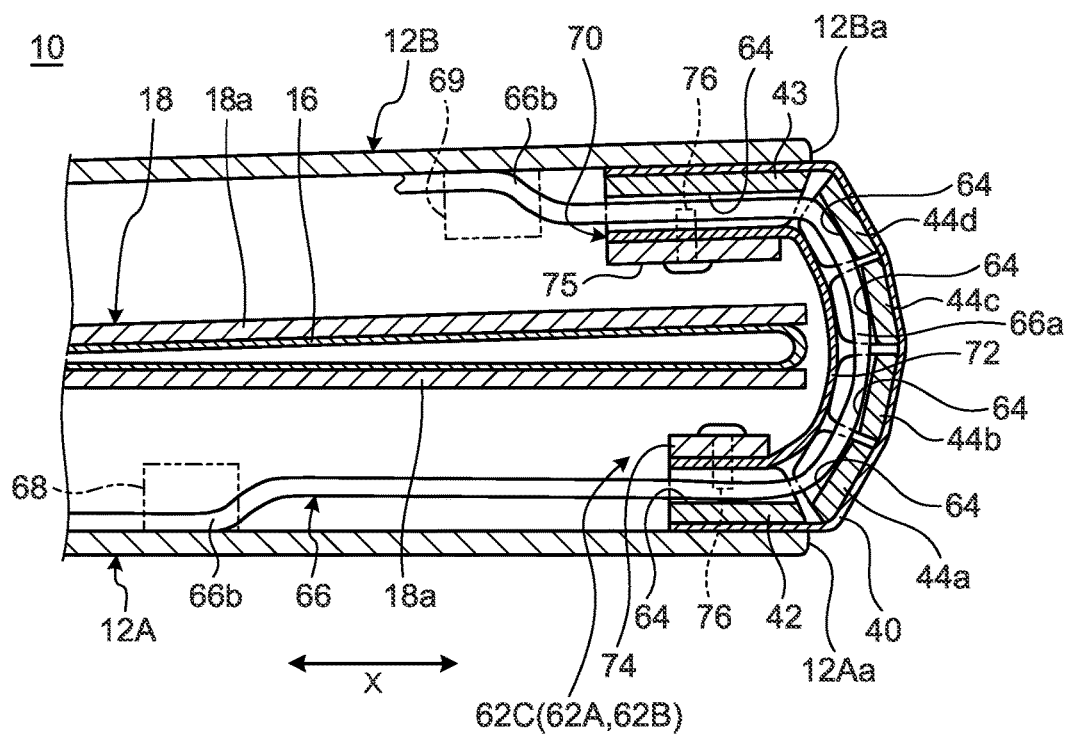
FIG. 15B is a cross-sectional view in a state where the portable information device illustrated in FIG. 15A is brought into the storage form.

FIG. 14A is a plan view in which the wiring line structure portion 62C illustrated in FIG. 13 is enlarged. FIG. 14B is a developed view illustrating the state of the wiring line structure portion 62C when the chassis members 12A and 12B illustrated in FIG. 14A are closed to bring the portable information device 10 into a storage form. More specifically, FIG. 14B is a figure in which the chassis members 12A and 12B of the storage form in which the chassis members 12A and 12B are actually folded into a double-folded state is developed on a plane and the internal structure thereof is clarified. FIG. 15A is a schematic cross-sectional view along the XIIA-XIIA line in FIG. 14A. FIG. 15B is a cross-sectional view in a state where the portable information device 10 illustrated in FIG. 15A is brought into the storage form. Hereinafter, the wiring line structure portion 62C is representatively described. More specifically, the wiring line structure portions 62A and 62B have the same structure except being symmetrical to the wiring line structure portion 62C in the Y direction, and therefore a detailed description thereof is omitted. In FIG. 15A and FIG. 15B, the illustration of the sheet-like member 18b, the tension spring 45, and the like is omitted.

First, the configuration of the wiring line structure portion 62C when the portable information device 10 is brought into the usage form as illustrated in FIG. 13, FIG. 14A, and FIG. 15A is described. The wiring lines 66 connect the main substrate 20 and the like on the first chassis member 12A side and the battery device 26 and the like on the second chassis member 12B side crossing the backbone member 60 as with the wiring line 54 illustrated in FIG. 3. Although one set containing four wiring lines 66 arranged in the Y direction is disposed in each of the wiring line structure portions 62A to 62C in FIG. 13, the number of the wiring lines 66 can be changed as appropriate.

In the usage form, the wiring lines 66 form a flexure portion 66a in which the wiring lines 66 are partially superfluous and slacken in the groove portions 64. More specifically, when the portable information device 10 is changed into the storage form from the usage form, the members present on the outer side relative to the shaft center of the hinge shafts 36a to 36d as the rotation axis of the hinge mechanism 19, i.e., on the chassis members 12A and 12B side, are extended in the X direction and the backbone member 60 slides along the chassis members 12A and 12B as with the backbone member 14. Therefore, the wiring lines 66 receive the extending force along the chassis members 12A and 12B to be separated from each other.

Thus, the flexure portion 66a in which the wiring lines 66 are made superfluous is formed in the groove portion 64, whereby changes in the required distance of the wiring lines 66 in changing the form of the portable information device 10 are dealt with in the wiring line structure portion 62C (62A, 62B). Therefore, the flexure amount of the wiring lines 66 in the flexure portion 66a is set to be equal to or larger than a total value of the movement distances of the inner end surfaces 12Aa and 12Ba of the chassis members 12A and 12B, respectively, when the chassis members 12A and 12B are opened and closed by the hinge mechanism 19, for example.

In the flexure portion 66a, the X direction from the first chassis member 12A to the second chassis member 12B as viewed in plan to the backbone member 60 is defined as base portions 66b and top portions 66c are angled into a chevron shape projecting from the base portions 66b in the Y direction. The base portions 66b of the wiring lines 66 are positioned and fixed by fixing portions 68 and 69 provided on the inner surfaces of the chassis members 12A and 12B, respectively, close to the backbone member 60.

The fixing portion 68 is provided on the inner surface of the first chassis member 12A and positions and fixes the wiring lines 66 while angling the wiring lines 66 in a direction from the base portions 66b to the top portions 66c of the flexure portion 66a. The fixing portion 68 has a configuration in which boomerang-shaped groove shapes with a narrow width individually angling the four wiring lines 66 while holding the same therebetween are arranged in parallel. Wall bodies 68a forming the groove shapes of the fixing portion 68 project from the inner surface of the first chassis member 12A. The fixing portion 69 is provided on the inner surface of the second chassis member 12B and positions and fixes the wiring lines 66 while angling the wiring lines 66 in a direction from the base portions 66b to the top portions 66c of the flexure portion 66a. The fixing portion 69 is symmetrical to the fixing portion 68 in the X direction. Wall bodies 69a project from the inner surface of the second chassis member 12B. Thus, bent portions of the wall bodies 68a and 69a of the fixing portions 68 and 69, respectively, function as angle setting portions angling and bending the wiring lines 66 toward the flexure portion 66a. Although a gap is provided and illustrated between the wall bodies 68a and 69a and the wiring lines 66 in FIG. 13 to FIG. 14B, the wiring lines 66 are actually put between the wall bodies 68a and 68a and between the wall bodies 69a and 69a.

The lid member 70 is a member closing an upper surface opening of the groove portion 64 and pressing down the wiring lines 66 in the groove portion 64 to prevent the wiring lines 66 from projecting from the groove portion 64. The lid member 70 has a sheet material 72 and a pair of fixing plates 74 and 75. The sheet material 72 is a thin film containing a material having flexibility, such as a thin resin film or metallic foil, as with the lid member 56 described above and is a stainless steel sheet in this embodiment. The fixing plates 74 and 75 are disposed on the upper surfaces of the support members 42 and 43, respectively, with the sheet material 72 interposed therebetween and are fixed to the support members 42 and 43 using screws 76 (see FIG. 15A).

The sheet material 72 presses down the wiring lines 66 in the groove portion 64 with the substantially entire surface of an undersurface 72a thereof to thereby prevent the projection from the groove portion 64 and entanglement of the wiring lines 66. In the wiring line structure portions 62A to 62C, the sheet material 72 covers the groove portions 64 and the fixing portions 68 and 69 position and align bundles of the wiring lines 66. Therefore, the wiring lines 66 move in parallel while maintaining the alignment state of the wiring lines 66. The fixing plates 74 and 75 are press plates for pressing down end portions in the X direction of the sheet material 72 to stably fix the sheet material 72 to the support members 42 and 43, respectively. This is because the sheet material 72 is the thin film as described above, and therefore, when the fixed structure is formed using the screws 76, there is a concern that breakage or the like occurs when the fixing plates 74 and 75 are not used.

As illustrated in FIG. 13, various kinds of components, such as the main substrate 20 and the battery device 26, are disposed inside the chassis members 12A and 12B, and therefore it is difficult to secure the insertion space of the wiring lines 66. More specifically, it is preferable in space efficiency to dispose the wiring lines 66 near outer peripheral edge portions of the chassis members 12A and 12B in many cases. Thus, in the wiring line structure portions 62A and 62C in both end portions of the backbone member 60, the top portions 66c form the chevron shapes disposed on the center side in the longitudinal direction of the backbone member 60, so that the wiring lines 66 can be easily disposed near the outer peripheral edge portions of the chassis members 12A and 12B in the flexure portion 66a. Although the flexure portion 66a forms a chevron shape in which the top portions 66c are disposed on the Y2 side in the central wiring line structure portion 62B, the top portions 66c of the flexure portion 66a may be directed in the opposite direction.

Therefore, the portable information device 10 provided with such wiring line structure portions 62A to 62C form the flexure portion 66a in which the wiring lines 66 are formed into the chevron shapes in the groove portions 64 in the usage form illustrated in FIG. 14A and FIG. 15A.

When the portable information device 10 of the usage form is folded into the storage form as illustrated in FIG. 14B and FIG. 15B, the inner end surfaces 12Aa and 12Ba of the chassis members 12A and 12B, respectively, are greatly separated from each other, and then the backbone member 60 slides to form a bent portion covering a gap widely opened between the inner end surface 12Aa and 12Ba. The wiring lines 66 are in a state of being movable in parallel in the groove portions 64. Therefore, the flexure portion 66a also receives a stress in a torsional direction around the shaft thereof while being extended in the X direction in connection with the deformation of the backbone member 60 with the fixing portions 68 and 69 on both ends of the base portions 66b as a fixing point when the chassis members 12A and 12B are folded. As a result, as illustrated in FIG. 14B and FIG. 15B, the distance between the base portions 66b of the flexure portion 66a increases due to the fact that the fixing portions 68 and 69 on both the ends are separated from each other in the X direction, and then the flexure portion 66a is extended until the chevron shape is formed into a substantially straight line shape without almost flexure.

Subsequently, when the portable information device 10 of the storage form is opened into the usage form again as illustrated in FIG. 14A and FIG. 15A, the flexure portion 66a in which the wiring lines 66 are extended receives contracting force again. At this time, the flexure portion 66a is angled into the chevron shape by the fixing portions 68 and 69 on both the ends, and therefore smoothly returns to the chevron shape again. Also in this case, the flexure portion 66a of the wiring lines 66 also receives the stress in the torsion direction while being contracted in the X direction in connection with the return deformation into the flat plate shape of the backbone member 60.

As described above, in the portable information device 10 provided with such a wiring line structure according to the modification, the wiring lines 66 connecting the chassis members 12A and 12B form the flexure portion 66a in which the wiring lines 66 partially flex in the groove portion 64 formed in the backbone member 60 in the usage form. Therefore, when the flexure portion 66a is extended in the groove portion 64 when the chassis members 12A and 12B are folded, the wiring lines 66 can easily absorb the changes in the connection distance. More specifically, the portable information device 10 can certainly absorb the extension/contraction of the wiring lines 66 in opening and closing the chassis members 12A and 12B, although the portable information device 10 has a simple configuration in which the flexure portion 66a is disposed in the backbone member 60. As a result, the wiring lines 66 can be prevented from causing defects, such as breakage or catching.

In the wiring lines 66, both end side portions of the flexure portion 66a are individually fixed to the inner surfaces of the chassis members 12A and 12B by the fixing portions 68 and 69, respectively. Therefore, the wiring lines 66 do not move on the inner surfaces of the chassis members 12A and 12B and only the flexure portion 66a moves in the groove portion 64, and therefore there is no necessity of securing the movement space of the wiring lines 66 in the inner surfaces of the chassis members 12A and 12B.

In particular, the flexure portion 66a is configured into the chevron shape as illustrated in FIG. 13, for example. Therefore, when the chassis members 12A and 12B are opened and closed by the hinge mechanism 19, the wiring lines 66 cause not a two-dimensional operation in which the angle of the top portion 66c is merely opened and closed but a three-dimensional operation in which the wiring lines 66 receive the torsional force around the shaft thereof. As a result, the wiring lines 66 can avoid the occurrence of stress concentration in one point thereof, e.g., the top portions 66c, and breakage with time in receiving repeated opening and closing operations of the chassis members 12A and 12B can be suppressed.

It is a matter of course that the present invention is not limited to the embodiments described above and can be freely altered without deviating from the scope of the present invention.

We claim:

1. A portable information device comprising:
   a first chassis member and a second chassis member, one edge portions of which are disposed adjacent to each other;
   a hinge mechanism rotatably connecting the one edge portions of the first chassis member and the second chassis member;
   a display between an inner surface of the first chassis member and an inner surface of the second chassis member and is foldable into a double-folded state; and
   a backbone member between the inner surface of the first chassis member and the inner surface of the second chassis member so as to cover a gap between the one edge portion of the first chassis member and the one edge portion of the second chassis member, wherein,
   the backbone member forms, when bent, a bent portion covering the gap so as to project from the gap when the first chassis member and the second chassis member are folded into a double-folded state by the hinge mechanism,
   the backbone member has a wall member closing at least one part of an opening formed in a side portion of the bent portion, a first plate member fixed to a side of the inner surface of the first chassis member to support a rear surface of the display; and a second plate member fixed to a side of the inner surface of the second chassis member to support the rear surface of the display, wherein, one end surfaces of the first plate member and the second plate member abut each other when the first chassis member and the second chassis member are opened into a flat shape by the hinge mechanism and the one end surfaces are separated from each other, and simultaneously separated from the rear surface of the display when the first chassis member and the second chassis member are folded into the double folded state by the hinge mechanism.

2. The portable information device according to claim 1, wherein:

the wall member is in a side portion of the backbone member and is a projection piece projecting towards a rear surface of the display from the side portion.

3. A portable information device comprising:

a first chassis member and a second chassis member, one edge portions of which are disposed adjacent to each other;

a hinge mechanism rotatably connecting the one edge portions of the first chassis member and the second chassis member;

a display between an inner surface of the first chassis member and an inner surface of the second chassis member and is foldable into a double-folded state; and a backbone member between the inner surface of the first chassis member and the inner surface of the second chassis member so as to cover a gap between the one edge portion of the first chassis member and the one edge portion of the second chassis member, wherein, the backbone member forms, when bent, a bent portion covering the gap so as to project from the gap when the first chassis member and the second chassis member are folded into a double-folded state by the hinge mechanism, the backbone member has a wall member closing at least one part of an opening formed in a side portion of the bent portion; a first plate member fixed to a side of the inner surface of the first chassis member to support the rear surface of the display; and a second plate member fixed to a side of the inner surface of the second chassis member to support the rear surface of the display, wherein, one end surfaces of the first plate member and the second plate member abut each other when the first chassis member and the second chassis member are opened into a flat shape by the hinge mechanism and the one end surfaces are separated from each other, and simultaneously separated from the rear surface of the display when the first chassis member and the second chassis member are folded into the double folded state by the hinge mechanism and the wall member supports at least one of rear surfaces of the first plate member and the second plate member when the first chassis member and the second chassis member are opened to a flat shape.

4. A portable information device comprising:

a first chassis member and a second chassis member, one edge portions of which are disposed adjacent to each other;

a hinge mechanism rotatably connecting the one edge portions of the first chassis member and the second chassis member;

a display between an inner surface of the first chassis member and an inner surface of the second chassis member and is foldable into a double-folded state; and a backbone member between the inner surface of the first chassis member and the inner surface of the second chassis member so as to cover a gap between the one edge portion of the first chassis member and the one edge portion of the second chassis member, wherein, the backbone member forms, when bent, a bent portion covering the gap so as to project from the gap when the first chassis member and the second chassis member are folded into a double-folded state by the hinge mechanism, the backbone member has a wall member closing at least one part of an opening formed in a side portion of the bent portion, the backbone member has a plurality of belt-like, plate-like members arranged side by side along a direction from the first chassis member to the second chassis member and a flexible sheet-like member connecting the plate-like members, and the wall member is in at least one part of at least the plate-like member forming the bent portion among the plurality of plate-like members.

* * * * *